US010690500B2

(12) United States Patent
Nishizawa et al.

(10) Patent No.: US 10,690,500 B2
(45) Date of Patent: Jun. 23, 2020

(54) SENSOR ELEMENT, SENSOR, ELECTRONIC APPARATUS, AND VEHICLE

(71) Applicant: Seiko Epson Corporation, Tokyo (JP)

(72) Inventors: Ryuta Nishizawa, Matsumoto (JP); Keiichi Yamaguchi, Ina (JP)

(73) Assignee: Seiko Epson Corporation (JP)

( * ) Notice: Subject to any disclaimer, the term of this patent is extended or adjusted under 35 U.S.C. 154(b) by 144 days.

(21) Appl. No.: 15/928,623

(22) Filed: Mar. 22, 2018

(65) Prior Publication Data

US 2018/0283865 A1 Oct. 4, 2018

(30) Foreign Application Priority Data

Mar. 28, 2017 (JP) ................................ 2017-062252
Mar. 28, 2017 (JP) ................................ 2017-062253

(51) Int. Cl.
*G01C 19/5642* (2012.01)
*G01C 19/5621* (2012.01)
*G01C 19/5607* (2012.01)
*G01C 19/5628* (2012.01)

(52) U.S. Cl.
CPC ..... *G01C 19/5642* (2013.01); *G01C 19/5607* (2013.01); *G01C 19/5621* (2013.01); *G01C 19/5628* (2013.01); *B60Y 2400/303* (2013.01)

(58) Field of Classification Search
CPC ............ G01C 19/5607; G01C 19/5621; G01C 19/5719; G01C 19/5691; G01C 19/5628; G01C 19/5642
See application file for complete search history.

(56) References Cited

U.S. PATENT DOCUMENTS

| 6,698,292 | B2 * | 3/2004 | Kikuchi | G01C 19/5607 |
| | | | | 73/504.12 |
| 7,255,005 | B2 * | 8/2007 | Ogura | G01C 19/5607 |
| | | | | 73/504.12 |
| 2005/0284223 | A1 | 12/2005 | Karaki et al. | |
| 2006/0162446 | A1 * | 7/2006 | Ogura | G01C 19/5607 |
| | | | | 73/504.12 |
| 2006/0162447 | A1 * | 7/2006 | Ogura | G01C 19/5607 |
| | | | | 73/504.12 |

(Continued)

FOREIGN PATENT DOCUMENTS

JP 2005-062160 A 3/2005
JP 3751745 B2 3/2006

(Continued)

*Primary Examiner* — Helen C Kwok
(74) *Attorney, Agent, or Firm* — Harness, Dickey & Pierce, P.L.C.

(57) ABSTRACT

A sensor element includes a base portion, a drive arm that extends from the base portion or a portion which is connected to the base portion, and a detection arm that extends from the base portion. The drive arm includes a drive arm portion that extends from the base portion or a portion which is connected to the base portion, and a drive weight portion that is provided on a front end side with respect to the drive arm portion and has a larger width than the drive arm portion. When a length of the drive weight portion in an extending direction of the drive arm is referred to as DHL and a width of the drive weight portion in a direction orthogonal to the extending direction in a planar view is referred to as DHW, a relationship of 1.5≤DHL/DHW is satisfied.

20 Claims, 14 Drawing Sheets

(56) References Cited

U.S. PATENT DOCUMENTS

| | | | |
|---|---|---|---|
| 2008/0178673 A1* | 7/2008 | Tateyama | G01C 19/5607 73/504.15 |
| 2013/0241353 A1 | 9/2013 | Asari | |
| 2016/0116285 A1* | 4/2016 | Ogura | G01C 19/5705 73/504.12 |

FOREIGN PATENT DOCUMENTS

| | | |
|---|---|---|
| JP | 2006-201118 A | 8/2006 |
| JP | 2007-108053 A | 4/2007 |
| JP | 2008-026110 A | 2/2008 |
| JP | 2008-058258 A | 3/2008 |
| JP | 4671284 B2 | 4/2011 |
| JP | 4771062 B2 | 9/2011 |
| JP | 4849284 B2 | 1/2012 |
| JP | 4893335 B2 | 3/2012 |
| JP | 4893838 B2 | 3/2012 |
| JP | 2015-99130 A | 5/2015 |
| JP | 2015-141184 A | 8/2015 |
| JP | 2015-206691 A | 11/2015 |
| JP | 2016-031270 A | 3/2016 |
| JP | 2016-038306 A | 3/2016 |
| JP | 2016-044977 A | 4/2016 |
| JP | 2016-085179 A | 5/2016 |
| JP | 2016-085185 A | 5/2016 |
| JP | 2016-118497 A | 6/2016 |
| JP | 2016-118499 A | 6/2016 |
| JP | 2016-133330 A | 7/2016 |
| JP | 2016-133427 A | 7/2016 |
| JP | 2016-133428 A | 7/2016 |
| JP | 5982896 B2 | 8/2016 |

* cited by examiner

SENSOR ELEMENT, SENSOR, ELECTRONIC APPARATUS, AND VEHICLE

BACKGROUND

1. Technical Field

The present invention relates to a sensor element, a sensor, an electronic apparatus, and a vehicle.

2. Related Art

For example, a physical quantity sensor (gyro sensor) described in JP-A-2016-085185 is known as a sensor. A sensor element included in the physical quantity sensor described in JP-A-2016-085185 includes a base portion, a pair of drive arms extending from the base portion, a pair of detection arms extending from the base portion to a side opposite to the drive arms, a fixing portion, and a plurality of connection portions connecting the base portion to the fixing portion. Here, the respective drive arms and the respective detection arms have arm portions, and wide portions having widths larger than a width of the arm portion. Each of the wide portions is provided at a front end portion of each of the drive arms and the detection arms.

For example, a gyro sensor described in JP-A-2006-201118 is known as a sensor. The gyro sensor described in JP-A-2006-201118 includes a base portion, a pair of detection arms linearly extending from the base portion toward both sides, a pair of connection arms extending from the base portion to both sides in a direction orthogonal to the detection arms, and a pair of drive arms which is orthogonal to a front end portion of each connection arm and extends from the front end portion of each connection arm toward both sides. In addition, in the gyro sensor, the base portion is supported by a lead plate fixed to a support substrate disposed at a bottom portion of a container.

The physical quantity sensor described in JP-A-2016-085185 has a problem that a detection sensitivity cannot be sufficiently increased because a planar view shape of the wide portion is close to a square. Particularly, in a case where the wide portion having a planar view shape is used as described in JP-A-2016-085185, if a sensor element is miniaturized, a decrease in the detection sensitivity (S/N ratio) is conspicuous.

In addition, since the gyro sensor described in JP-A-2006-201118 has a short distance between a connection portion connecting the base portion to the lead plate and the connection arm, the base portion is easily influenced by force such as stress from the lead plate. Accordingly, the gyro sensor described in JP-A-2006-201118 has a problem in which, when a state of the force such as stress applied to the base portion from the lead plate changes due to a temperature change or the like, a detection frequency varies due to the change, a detuning frequency (a difference between a drive frequency and a detection frequency) also varies in accordance with the variation, and as a result, the detection sensitivity changes. Such a problem is conspicuous in particular in that, in a case where the gyro sensor is miniaturized, the distance between the connection portion connecting the base portion to the lead plate and the connection arm is shortened.

SUMMARY

An advantage of some aspects of the invention is to provide a sensor element and a sensor which can increase detection sensitivity, and an electronic apparatus and a vehicle which include the sensor element (sensor).

Another advantage of some aspects of the invention is to provide a sensor which can stabilize detection sensitivity, and an electronic apparatus and a vehicle which include the sensor.

The invention can be implemented as the following forms or application examples.

A sensor element according to an application example includes a base portion, a drive arm that extends from the base portion or a portion which is connected to the base portion, and a detection arm that extends from the base portion, in which the drive arm includes a drive arm portion that extends from the base portion or a portion which is connected to the base portion, and a drive weight portion that is provided on a front end side with respect to the drive arm portion and has a larger width than the drive arm portion, and in which, when a length of the drive weight portion in an extending direction of the drive arm is referred to as DHL and a width of the drive weight portion in a direction orthogonal to the extending direction in a planar view is referred to as DHW, a relationship of 1.5≤DHL/DHW is satisfied.

According to the sensor element, the length DHL and the width DHW satisfy the above-mentioned relationship, and thereby, the detection sensitivity can be increased.

In the sensor element according to the application example, it is preferable that a relationship of 1.5≤DHL/DHW≤4.0 is satisfied.

With this configuration, detection sensitivity can be increased while reducing a crystal impedance (CI) value to achieve low power consumption.

In the sensor element according to the application example, it is preferable that, when a length of the drive arm portion in the extending direction is referred to as DAL, a relationship of 1.5<DHL/DAL is satisfied.

With this configuration, detection sensitivity can be increased.

In the sensor element according to the application example, it is preferable that, when a width of the drive arm portion in a direction orthogonal to an extending direction in a planar view is referred to as DAW, a relationship of 1.2≤DHW/DAW is satisfied.

With this configuration, detection sensitivity can be increased while reducing a size.

In the sensor element according to the application example, it is preferable that the detection arm includes a detection arm portion that extends from the base portion, and a detection weight portion that is provided on a front end side with respect to the detection arm portion and has a larger width than the detection arm portion, and, when a length of the detection arm portion in an extending direction of the detection arm is referred to as PAL and a length of the detection weight portion in the extending direction of the detection arm is referred to as PHL, a relationship of DHL/DAL>PHL/PAL is satisfied.

With this configuration, detection sensitivity can be increased.

In the sensor element according to the application example, it is preferable that the detection arm includes a first detection arm extending from the base portion in a first direction and a second detection arm extending from the base portion in a direction opposite to the first direction, the portion connected to the base portion includes a first connection arm extending from the base portion in a second direction crossing the first direction and a second connection arm extending from the base portion in a direction opposite to the second direction, and the drive arm includes a first drive arm extending from the first connection arm in the first direction and a second drive arm extending from the second connection arm in the first direction.

With this configuration, a so-called double T type sensor element can be realized.

In the sensor element according to the application example, it is preferable that the first detection arm includes a detection arm portion extending from the base portion and a detection weight portion that is provided on a front end side with respect to the detection arm portion and has a larger width than the detection arm portion, and, when a width in a direction orthogonal to the first direction in the planar view including the drive weight portion of the first drive arm and the drive weight portion of the second drive arm is referred to as Wa, and at least one of a distance between the detection weight portion in the second direction and the drive weight portion of the first drive arm and a distance between the detection weight portion in the second direction and the drive weight portion of the second drive arm is referred to as L1, a relationship of $0.15 \times Wa < L1 < 0.4 \times Wa$ is satisfied.

With this configuration, even in a case where a support portion that supports a base portion is formed integrally with a base portion, it is possible to reduce that the support portion (particularly, connection portions connecting fixing portions fixed to a package to the base portion) comes into contact with drive arms and detection arms.

In the sensor element according to the application example, it is preferable that a pair of the detection arms extending from the base portion on the same side as each other, and a pair of the drive arms extending from the base portion toward a side opposite to an extending direction of the pair of detection arms are further included.

With this configuration, a so-called H type sensor element can be realized.

A sensor according to an application example includes the sensor element according to the application example described above.

According to the sensor, detection sensitivity can be increased.

A sensor according to an application example includes a base portion, a pair of detection arms extending from the base portion in directions opposite to each other, a pair of connection arms extending from the base portion in directions crossing extending directions of the detection arms and in the directions opposite to each other, a pair of drive arms extending from each of the pair of connection arms in directions crossing extending directions of the connection arms and in the directions opposite to each other, a plurality of connection portions which are arranged on the base portion, a base, a support member that is connected to the plurality of connection portions and supports the base portion with respect to the base, in which, when a length of the base portion in the extending directions of the connection arms is referred to as Bx and a total length of the plurality of connection portions in the extending directions of the connection arms is referred to as B1, a relationship of $B1/Bx \leq 0.43$ is satisfied.

According to the sensor, the lengths Bx and B1 satisfy the above-mentioned relationship, and thereby, a distance between a connection portion and a connection arm increases. Accordingly, in a detection mode in which a detection arm vibrates in conjunction with the connection arm, it is possible to reduce that the vibration frequency (detection frequency) of the detection arm is influenced by a change in a supported state (restrained state) of the base portion due to the support member, and as a result, the detection sensitivity can be stabilized.

In the sensor according to the application example, it is preferable that a relationship of $0.25 \leq B1/Bx \leq 0.43$ is satisfied.

With this configuration, detection sensitivity can be stabilized while reducing a size of the sensor.

In the sensor according to the application example, it is preferable that, when a length of the base portion in the extending directions of the detection arms is referred to as By and a total length of the plurality of connection portions in the extending directions of the detection arms is referred to as B2, a relationship of $B2/By \geq 0.5$ is satisfied.

With this configuration, detection sensitivity can be improved.

In the sensor according to the application example, it is preferable that the plurality of connection portions are arranged in a matrix.

With this configuration, the connection portions are efficiently arranged while miniaturizing the sensor.

In the sensor according to the application example, it is preferable that the plurality of connection portions are arranged in a matrix form with predetermined intervals in the extending directions of the connection arms and with predetermined intervals in directions crossing the extending directions of the connection arms.

With this configuration, the connection portions are efficiently arranged while miniaturizing the sensor.

In the sensor according to the application example, it is preferable that the support member includes a plurality of wires that are connected to the plurality of connection portions.

With this configuration, a support member can be configured by using a flexible wiring board, and tape automated bonding (TAB) mounting can be performed. In addition, in the TAB mounting, a base portion is easily influenced by distortion of the support member due to a temperature change or the like in general. Thus, in a case where the support member is used, satisfying a relationship between B1 and Bx described above is particularly useful for stabilizing detection sensitivity.

In the sensor according to the application example, it is preferable that the drive arm includes a drive arm portion extending from the connection arm and a drive weight portion that is provided on a front end side with respect to the drive arm portion and has a larger width than the drive arm portion, and, when a length of the drive weight portion in the extending direction of the drive arm is referred to as DHL and a width of the drive weight portion in a direction orthogonal to the extending direction of the drive arm in a planar view is referred to as DHW, a relationship of $1.5 \leq DHL/DHW$ is satisfied.

With this configuration, detection sensitivity can be increased.

In the sensor according to the application example, it is preferable that a relationship of $1.5 \leq DHL/DHW \leq 4.0$ is satisfied.

With this configuration, detection sensitivity can be increased while reducing a crystal impedance (CI) value to achieve low power consumption.

In the sensor according to the application example, it is preferable that, when a length of the drive arm portion in the extending direction of the drive arm is referred to as DAL, a relationship of $1.5 < DHL/DAL$ is satisfied.

With this configuration, detection sensitivity can be increased.

In the sensor according to the application example, it is preferable that, when a width of the drive arm portion in a direction orthogonal to the extending direction in a planar view is referred to as DAW, a relationship of 1.2≤DHW/DAW is satisfied.

With this configuration, detection sensitivity can be increased while reducing a size.

In the sensor according to the application example, it is preferable that the detection arm includes a detection arm portion extending from the base portion and a detection weight portion that is provided on a front end side with respect to the detection arm portion and has a larger width than the detection arm portion, and, when a length of the drive arm portion in the extending direction of the drive arm is referred to as DAL, a length of the detection arm portion in the extending direction of the detection arm is referred to as PAL, and a length of the detection weight portion in the extending direction of the detection arm is referred to as PHL, a relationship of DHL/DAL>PHL/PAL is satisfied.

With this configuration, detection sensitivity can be increased.

An electronic apparatus according to an application example includes the sensor element (sensor) according to the application example described above.

According to the electronic apparatus, characteristics of an electronic apparatus can be enhanced by excellent characteristics (detection sensitivity and the like) of the sensor element.

An electronic apparatus according to an application example includes the sensor according to the application example described above.

According to the electronic apparatus, detection sensitivity of the sensor is stabilized, and thereby, characteristics (for example, reliability) of an electronic apparatus can be enhanced.

A vehicle according to an application example includes the sensor element (sensor) according to the application example.

According to the vehicle, characteristics of a vehicle can be enhanced by excellent characteristics (detection sensitivity and the like) of the sensor element.

A vehicle according to an application example includes the sensor according to the application example described above.

According to the vehicle, detection sensitivity of the sensor is stabilized, and thereby, characteristics (for example, reliability) of the vehicle can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a sensor element, a sensor, an electronic apparatus, and a vehicle according to the invention will be described in detail based on embodiments illustrated in the accompanying drawings.

1. Sensor

First Embodiment

Figure 1:
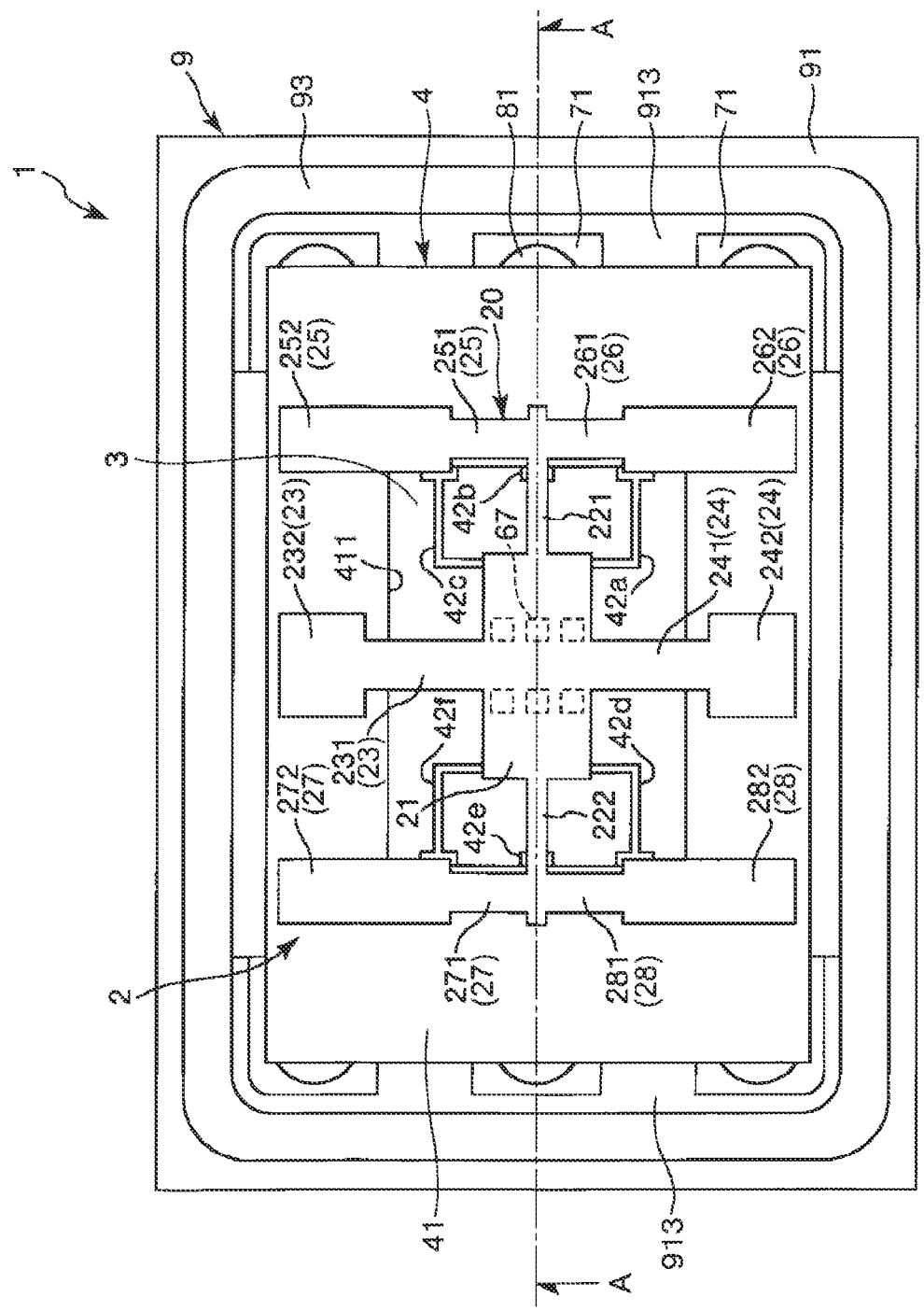
FIG. 1 is a plan view illustrating a schematic configuration of a sensor according to a first embodiment of the invention.
Figure 2:
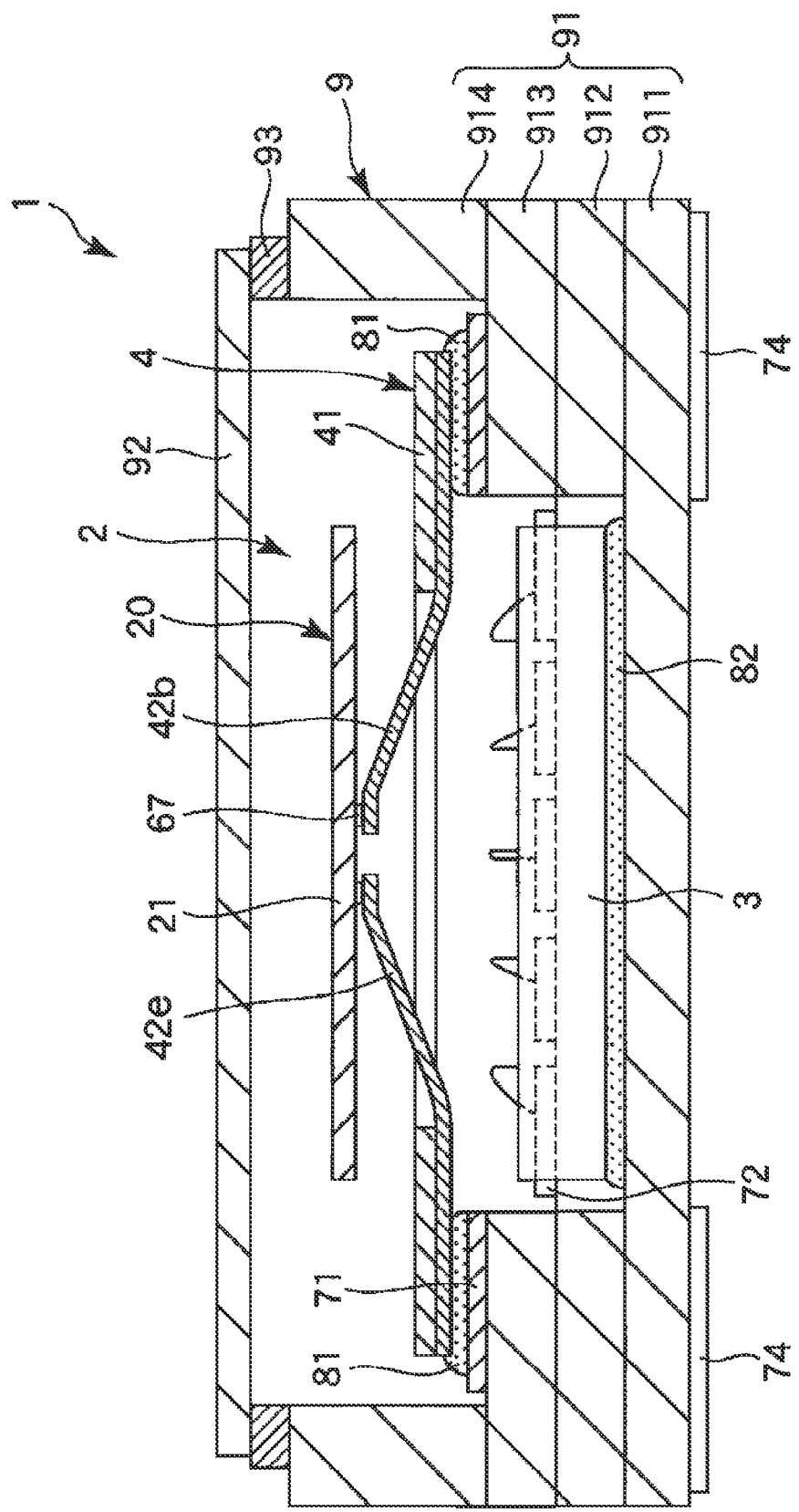
FIG. 2 is a cross-sectional view taken along line II-II in FIG. 1.
Figure 3:
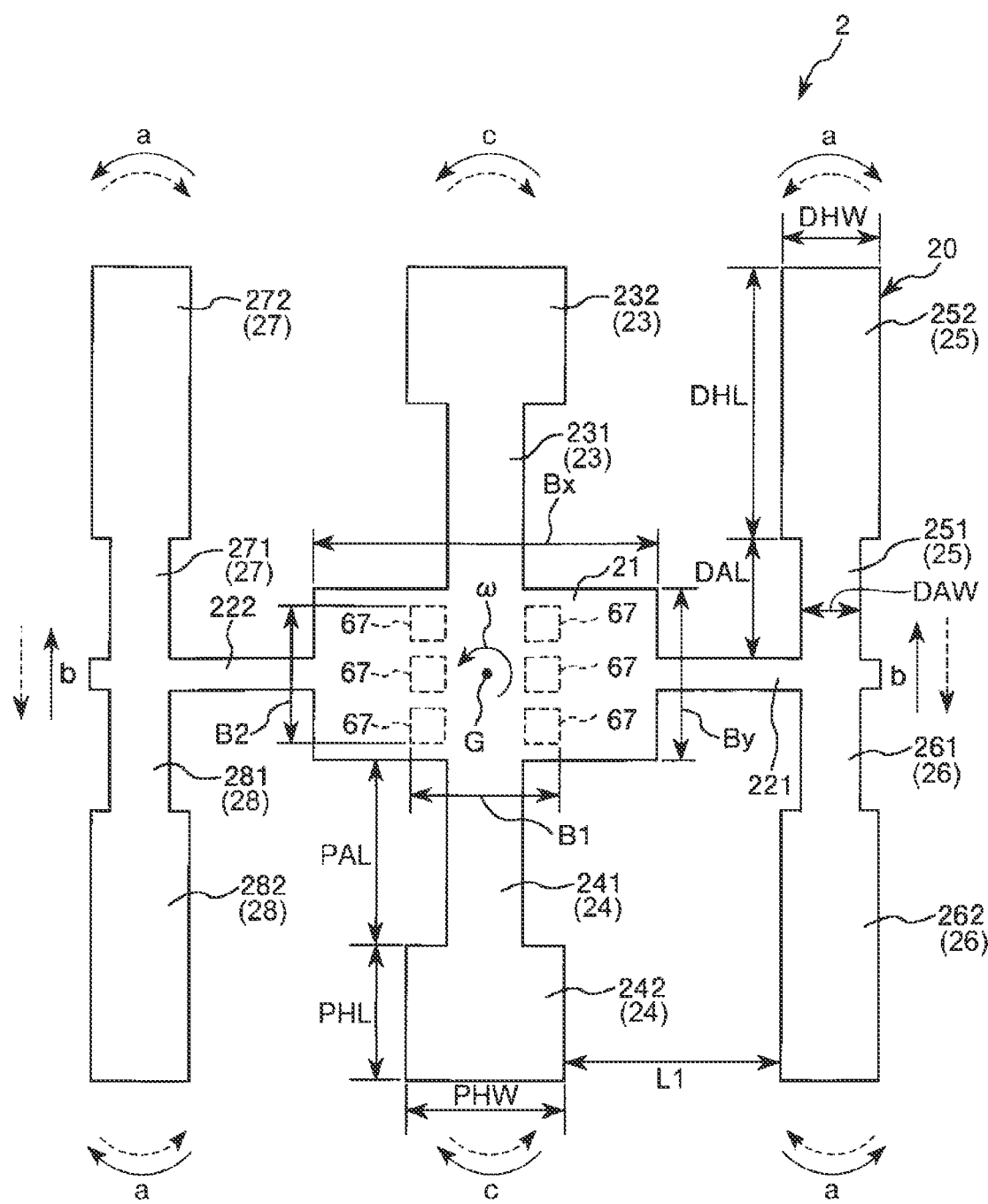
FIG. 3 is a plan view of vibrator element piece (sensor element) included in the sensor illustrated in FIG. 1.
Figure 4:
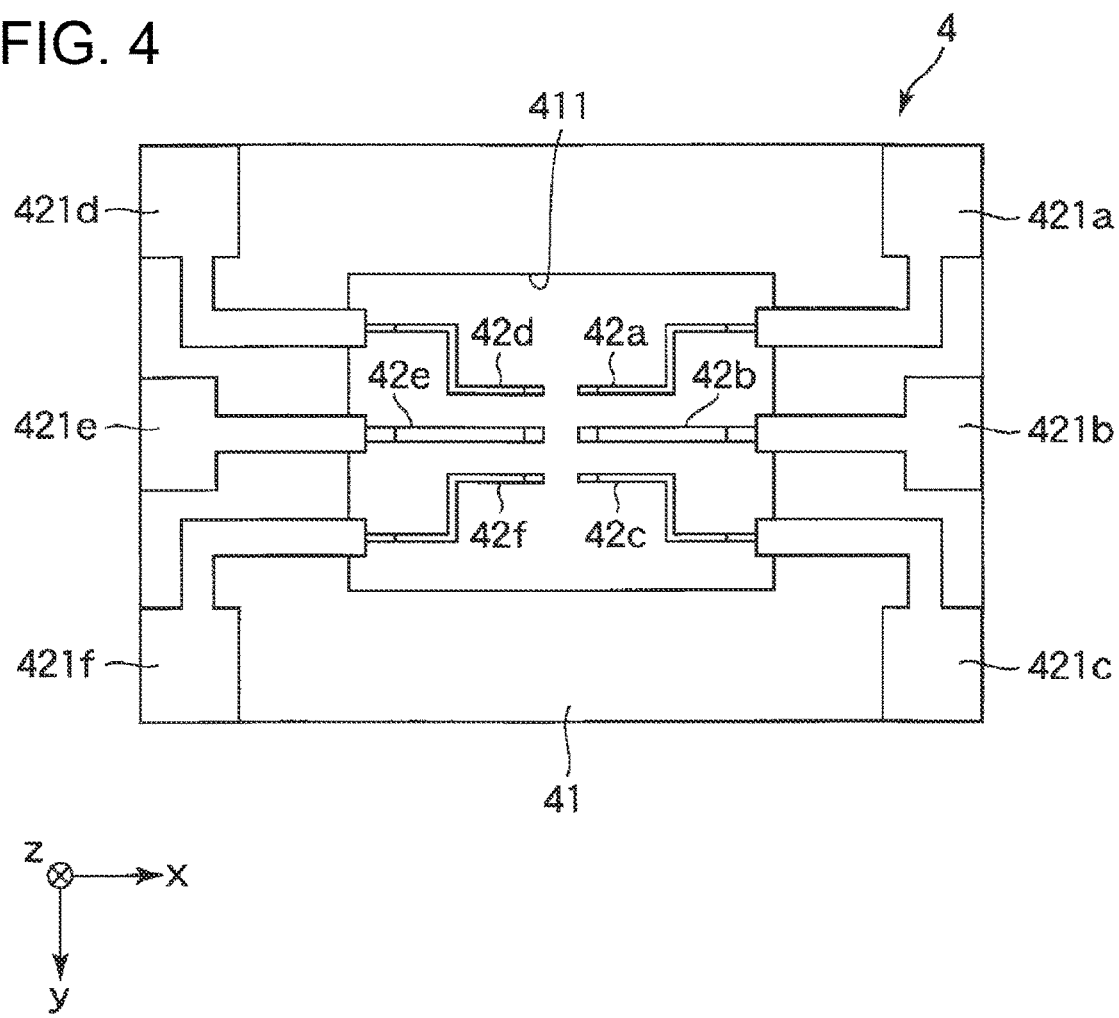
FIG. 4 is a plan view (rear view) of a support member included in the sensor illustrated in FIG. 1.

FIG. 1 is a plan view illustrating a schematic configuration of a sensor according to an embodiment of the invention. FIG. 2 is a cross-sectional view taken along line II-II in FIG. 1. FIG. 3 is a plan view of a vibrator element piece (sensor element) included in the sensor illustrated in FIG. 1. FIG. 4 is a plan view (rear view) of a support member included in the sensor illustrated in FIG. 1.

In the following description, for the sake of convenient description, the description will be made by using three axes, the x axis, the y axis and the z axis orthogonal to each other, as appropriate. In addition, in the following description, a direction parallel to the x axis is referred to as an "x-axis direction", a direction parallel to the y axis is referred to as a "y-axis direction", and a direction parallel to the z axis is referred to as a "z-axis direction". In addition, in the following description, a front end side of an arrow indicating the x axis, the y axis, or the z axis in the figures is referred to as "+", and a base end side thereof is referred to as "−". In addition, an upper side (+z-axis direction side) in FIG. 2 is referred to as "upper" and a lower side (−z-axis direction side) is referred to as "lower". In addition, a lid 92 which will be described below is omitted in FIG. 1, for the sake of convenient description.

A sensor 1 illustrated in FIGS. 1 and 2 is a vibration gyro sensor which detects an angular velocity around the z axis. The sensor 1 includes a sensor element 2 (vibrator element) having a vibrator element piece 20 (sensor element piece) and a support member 4, an IC chip 3 (integrated circuit chip), and a package 9 that contains the sensor element and the IC chip.

Hereinafter, each unit configuring the sensor 1 will be sequentially described.

Vibrator Element

The sensor element 2 is an "out-of-surface detection type" sensor element that detects the angular velocity around the z axis. As illustrated in FIGS. 1 and 2, the sensor element 2 includes the vibrator element piece 20 and the support member 4 that supports the vibrator element piece 20.

As illustrated in FIG. 3, the vibrator element piece 20 has a so-called double T type structure. More specifically, the vibrator element piece 20 includes a base portion 21, a pair of detection arms 23 and 24 (first and second detection arms) and a pair of connection arms 221 and 222 (first and second connection arms) which extend from a base portion 21, a pair of drive arms 25 and 26 (first drive arm) extending from the connection arm 221, and a pair of drive arms 27 and 28 (second drive arm) extending from the connection arm 222.

Here, the detection arm 23 (first detection arm) extends from the base portion 21 in the +y-axis direction (first direction), whereas the detection arm 24 (second detection arm) extends from the base portion 21 in the −y-axis direction opposite to an extending direction of the detection arm 23. That is, the detection arms 23 and 24 extend from the base portion 21 in directions opposite to each other in the y-axis direction. The connection arm 221 (first connection arm) extends from the base portion 21 in the +x-axis direction (second direction) crossing the extending direction of the detection arm 23, whereas the connection arm 222 (second connection arm) extends from the base portion 21 in the −y-axis direction opposite to an extending direction of the connection arm 221. The drive arm 25 (first drive arm) extends in the +y-axis direction (first direction) from the front end portion (end portion on a side opposite to the base portion 21 of the connection arm 221) of the connection arm 221, whereas the drive arm 26 extends from the front end portion of the connection arm 221 in the −y-axis direction opposite to the extending direction of the drive arm 25. That is, the drive arms 25 and 26 extend from the front end portion of the connection arm 221 in directions opposite to each other in the y-axis direction. In the same manner, the drive arm 27 (second drive arm) extends from the front end portion of the connection arm 222 in the +y-axis direction (first direction), whereas the drive arm 28 extends from the front end portion of the connection arm 222 in the −y-axis direction opposite to the extending direction of the drive arm 27. That is, the drive arms 27 and 28 extend from the front end portion of the connection arm 222 in directions opposite to each other in the y-axis direction.

In addition, the detection arm 23 includes an arm portion 231 (detection arm portion) extending from the base portion 21 and a weight portion 232 (detection weight portion) provided on a front end side with respect to the arm portion 231 and having a width larger than a width of the arm portion 231. In the same manner, the detection arm 24 includes an arm portion 241 (detection arm portion) and a weight portion 242 (detection weight portion). In addition, the drive arm 25 includes an arm portion 251 (drive arm portion) extending from the connection arm 221 and a weight portion 252 (drive weight portion) provided on a front end side with respect to the arm portion 251 and having a width larger than a width of the arm portion 251. In the same manner, the drive arm 26 includes an arm portion 261 (drive arm portion) and a weight portion 262 (drive weight portion). In addition, the drive arm 27 includes an arm portion 271 (drive arm portion) extending from the connection arm 222 and a weight portion 272 (drive weight portion) provided on a front end side with respect to the arm portion 271 and having a width larger than a width of the arm portion 271. In the same manner, the drive arm 28 includes an arm portion 281 (drive arm portion) and a weight portion 282 (drive weight portion). Grooves or holes may be formed in an upper surface and a lower surface of each arm in the extending directions.

Here, when a length of each of the weight portions 252, 262, 272, and 282 (drive weight portions) in the extending direction (y-axis direction) of the drive arms 25 to 28 is referred to as DHL and a width of each of the weight portions 252, 262, 272, and 282 in the direction (x-axis direction) orthogonal to the extending direction (y-axis direction) of the drive arms 25 to 28 at the time of viewing from a thickness direction (z-axis direction) of the base portion 21, that is, in a planar view (hereinafter, simply referred to as a "planar view") is referred to as DHW, a relationship of $1.5 \leq DHL/DHW$ and particularly, a relationship of $1.5 \leq DHL/DHW \leq 4.0$ is satisfied. Thereby, it is possible to increase detection sensitivity. This point will be described in detail below along with matters related to this point.

In the present embodiment, the vibrator element piece 20 is configured with a piezoelectric material. The piezoelectric material includes, for example, quartz crystal, lithium tantalate, lithium niobate, lithium borate, barium titanate, and the like. Particularly, it is preferable that the quartz crystal (Z cut plate) is used as the piezoelectric material configuring the vibrator element piece 20. It is possible for the vibrator element piece 20 configured by the quartz crystal to have excellent vibration characteristics (particularly, frequency temperature characteristics). In addition, it is possible to form the vibrator element piece 20 with high dimensional accuracy by etching.

A pair of drive electrodes (drive signal electrodes and drive ground electrodes) for flexural vibration of the drive arms 25, 26, 27, and 28 in the x-axis direction by supplying power are respectively provided in the drive arms 25, 26, 27, and 28 of the vibrator element piece 20 configured as described above, while not illustrated.

In addition, a pair of detection electrodes (detection signal electrodes and detection ground electrodes) for detecting electric charges generated by flexural vibration of the detection arms 23 and 24 in the x-axis direction are respectively provided in the detection arms 23 and 24 of the vibrator element piece 20, while not illustrated.

In addition, a plurality of terminals 67 (connection portions) are provided in the base portion 21. The plurality of terminals 67 are bonded (connected) to the support member 4. The plurality of terminals 67 are arranged in a matrix form with predetermined intervals in the extending directions of the connection arms 221 and 222 and with predetermined intervals in directions crossing the extending directions of the connection arms 221 and 222. Thereby, it is possible to efficiently arrange the plurality of terminals 67 while reducing a size of the sensor 1. When a length of the base portion 21 in the extending direction (the x-axis direction) of the connection arms 221 and 222 is referred to as Bx and the total length of the plurality of terminals 67 in the extending direction (the x-axis direction) of the connection arms 221 and 222 is referred to as B1, it is preferable that the base portion 21 satisfies a relationship of B1/Bx≤0.43. Thereby, it is possible to stabilize detection sensitivity. This point will be described in detail below along with matters related to this point. In addition, it is preferable that the relationship of B1/Bx≤0.43 is satisfied and lengths and widths of the respective units in the detection arms 23 and 24 and the drive arms 25 to 28 are optimized as will be described below. The plurality of terminals 67 are electrically connected to detection electrodes provided in the detection arms 23 and 24 described above and drive electrodes provided in the drive arms 25 to 28 through wires not illustrated.

While not limited in particular, for example, a metal material such as gold (Au), a gold alloy, platinum (Pt), aluminum (Al), an aluminum alloy, silver (Ag), a silver alloy, chromium (Cr), a chromium alloy, copper (Cu), molybdenum (Mo), niobium (Nb), tungsten (W), iron (Fe), titanium (Ti), cobalt (Co), zinc (Zn), and zirconium (Zr), or a transparent electrode material such as ITO and ZnO can be used as configuration materials of the drive electrode, the detection electrode, and the terminal 67. It is preferable that a metal (gold, a gold alloy) that mainly contains gold, or platinum among those is used.

A layer of Ti, Cr, or the like may be provided between the drive electrode or the like and the vibrator element piece 20 as a ground layer having a function of preventing the drive electrode or the like from being separated from the vibrator element piece 20. In addition, the drive electrode and the like can be collectively formed by the same film formation process.

The vibrator element piece 20 is supported by the package 9 via the support member 4 for mounting tape automated bonding (TAB) at the base portion 21.

As illustrated in FIG. 2, the support member 4 includes an insulating film 41 and a plurality of wires 42a to 42f bonded onto one surface (lower side in FIG. 2) of the film 41.

The film 41 has a function of supporting the wires 42a to 42f while preventing the wires from being short-circuited. A material having an insulating property may be used as a configuration material of the film 41, but it is preferable to use a resin material such as polyimide as the configuration material of the film 41. Thereby, the film 41 can be insulated, and conductor patterns such as the wires 42a to 42f can be formed on the film 41. In addition, it is possible to realize the support member 4 easily and inexpensively by using a flexible wiring board.

As illustrated in FIG. 4, a device hole 411 is formed in a central portion of the film 41, each of the wires 42a to 42f extends from the film 41 toward the device hole 411 side, and the extending portion is bent toward the film 41 side (upper side).

The plurality of wires 42a to 42f are provided corresponding to the plurality of terminals 67 provided in the above-described vibrator element piece 20 (see FIG. 3), and front end portions of the respective wires 42a to 42f are connected and fixed to the corresponding terminals 67 via a bonding material such as a metal bump not illustrated. Thereby, the drive electrode and the detection electrode are electrically connected to the terminals 67, and the vibrator element piece 20 is supported by the support member 4. In addition, connection terminals 421a to 421f are respectively provided at base end portions of the wires 42a to 42f.

The sensor element 2 configured as described above detects an angular velocity ω around the z axis as follows.

First, by applying a voltage (drive signal) between a pair of the drive electrodes, the drive arm 25 and the drive arm 27 perform flexural vibration (drive vibration) so as to approach each other or to be separated from each other in a direction indicated by the arrow a in FIG. 3, and the drive arm 26 and the drive arm 28 perform flexural vibration (drive vibration) so as to approach each other or to be separated from each other in the same direction as the flexural vibration. A frequency of the drive vibration is referred to as a "drive frequency", and the drive frequency becomes a frequency corresponding to a resonance frequency of the drive arms 25 to 28.

At this time, if an angular velocity is not applied to the sensor element 2, the base portion 21, the connection arms 221 and 222, and the detection arms 23 and 24 hardly vibrate because the drive arms 25 and 26 and the drive arms 27 and 28 perform plane-symmetric vibration with respect to the yz plane passing through a center point (center of gravity G).

As such, if the angular velocity ω around a normal line (that is, around the z axis) passing through the center of gravity of the sensor element 2 is applied to the sensor element 2 in a state (drive mode) where the drive arms 25 to 28 perform drive vibration, Coriolis force acts on each of the drive arms 25 to 28. Thereby, the connection arms 221 and 222 perform flexural vibration in a direction indicated by an arrow b in the figure, and along with this, flexural vibration (detection vibration) of the detection arms 23 and 24 in a direction indicated by an arrow c in the figure is excited so as to cancel the flexural vibration. A frequency of the detection vibration is referred to as a "detection frequency", and the detection frequency becomes a frequency corresponding to a resonance frequency of the detection arms 23 and 24. In addition, a difference between the drive frequency and the detection frequency is referred to as a "detuning frequency".

Electric charges are generated between the pair of detection electrodes by detection vibration (detection mode) of the detection arms 23 and 24. The angular velocity ω applied to the sensor element 2 can be obtained based on the electric charges.

IC Chip 3

The IC chip 3 illustrated in FIGS. 1 and 2 is an electronic component having a function of driving the above-described sensor element 2 and a function of detecting an output (sensor output) of the sensor element 2. While not illustrated, the IC chip 3 includes a drive circuit that drives the sensor element 2 and a detection circuit that detects an output (electric charges) of the sensor element 2. In addition, a plurality of connection terminals (not illustrated) are provided in the IC chip 3. The plurality of connection terminals include one connection terminal that outputs a drive signal for driving the above-described sensor element 2 and two connection terminals to which a detection signal from the sensor element 2 is input.

Package

The package 9 illustrated in FIGS. 1 and 2 contains the sensor element 2 (vibrator element piece 20 and support member 4) and the IC chip 3 (integrated circuit chip).

The package 9 includes a base 91 having a concave portion of which an upper surface is open, and a lid 92 bonded to the base 91 via a bonding member 93 (seal ring) so as to close an opening of the concave portion of the base 91.

The base 91 is configured with a substrate 911 of flat plate shape, a substrate 912 of a frame shape bonded to an upper surface of the substrate 911, a substrate 913 of a frame shape bonded to an upper surface of the substrate 912, and a substrate 914 of a frame shape bonded to an upper surface of the substrate 913. Thereby, a concave portion having a step difference between the respective substrates 911, 912, 913, and 914 is formed in the base 91. A configuration material (each configuration material of the substrates 911 to 914) of the base 91 is not limited in particular, and, for example, various ceramics such as aluminum oxide can be used for configuration material of the base 91.

The IC chip 3 is supported by and fixed to an upper surface of the substrate 911 of the base 91, via a fixing member 82 such as an adhesive configured to include an epoxy resin or an acrylic resin so as to be contained in the opening of the substrates 912 and 913.

In addition, a plurality of internal terminals 72 are provided on the upper surface of the substrate 912. In addition, a plurality of internal terminals 71 are provided on the upper surface of the substrate 913.

The plurality of internal terminals 71 are electrically connected to the corresponding internal terminals 72 via wires (not illustrated) provided on the base 91. The connection terminals 421a to 421f of the support member 4 are bonded to the plurality of internal terminals 71 via the fixing member 81. Thereby, the vibrator element piece 20 is supported by the base 91 via the support member 4. The fixing member 81 is formed of, for example, solder, silver paste, a conductive adhesive (adhesive in which a conductive filler such as metal particles is dispersed in a resin material), and the like. Thereby, the plurality of internal terminals 71 are electrically connected to the connection terminals 421a to 421f of the support member 4 via the fixing member 81, respectively.

A plurality of connection terminals of the above-described IC chip 3 are electrically connected to the plurality of internal terminals 72 via, for example, wires configured by bonding wires.

In addition, a plurality of external terminals 74, which are used when mounted on an apparatus (external apparatus) into which the sensor 1 is incorporated, are provided on a lower surface (side opposite to the sensor element 2) of the substrate 911 of the base 91. Each of the plurality of external terminals 74 is electrically connected to the corresponding internal terminal 72 via an internal wire (not illustrated). Thereby, each external terminal 74 is electrically connected to the IC chip 3.

Each of the internal terminals 71 and 72, each of the external terminals 74, and the like are respectively formed of a metallic coating film in which a coating film of nickel (Ni), gold (Au), or the like is laminated on a metallized layer of tungsten (W) or the like.

The lid 92 is airtightly bonded to the base 91 via the bonding member 93. Thereby, the inside of the package 9 is hermetically sealed. For example, the lid 92 is formed of the same material as the base 91, or formed of a metal such as Kovar, 42 alloy, stainless steel or the like. In addition, the bonding member 93 is formed of a metal such as Kovar, 42 alloy, stainless steel or the like.

The base 91 and the lid 92 are bonded to each other by, for example, seam welding, energy ray welding such as laser, or the like.

As described above, the sensor 1 includes the sensor element 2. According to the sensor 1, detection sensitivity can be increased as described in detail below. In addition, in a case where the sensor 1 satisfies a relationship of $B1/Bx \leq 0.43$, the detection sensitivity can be stabilized as described in detail below.

As described above, the sensor element 2 includes the base portion 21, the drive arms 25 to 28 extending from the connection arms 221 and 222 which are portions connected to the base portion 21, and the detection arm 23 and 24 extending from the base portion 21.

In the present embodiment, the sensor element 2 includes the pair of detection arms 23 and 24 extending from the base portion 21 in directions (±y-axis directions) opposite to each other, the pair of connection arms 221 and 222 extending from the base portion 21 in a direction crossing the extending direction (y-axis direction) of the pair of detection arms 23 and 24 and in directions (±x-axis direction) opposite to each other, the pair of drive arms 25 and 26 extending from the connection arm 221 in a direction crossing the extending direction (x-axis direction) of the connection arm 221 and in directions (±y-axis direction) opposite to each other, and the pair of drive arms 27 and 28 extending from the connection arm 222 in directions (±y-axis direction) opposite to each other in the same manner. Thereby, it is possible to realize a so-called double T type sensor element 2.

Here, the drive arm 25 includes the arm portion 251 which is a drive arm portion extending from the connection arm 221 (a portion connected to the base portion 21), and the weight portion 252 that is a drive weight portion which is provided on a front end side with respect to the arm portion 251 and has a larger width than the arm portion 251. In the same manner, the drive arms 26, 27, and 28 include the arm portions 261, 271, and 281 which are drive arm portions, and the weight portions 262, 272, and 282 which are drive weight portions.

Particularly, when the length of each of the weight portions 252, 262, 272, and 282 (drive weight portions) in the extending direction (y-axis direction) of the drive arms 25 to 28 is referred to as DHL and the width of each of the weight portions 252, 262, 272, and 282 (drive weight portions) in the direction (x-axis direction) orthogonal to the extending direction (y-axis direction) of the drive arms 25 to 28 at the time of viewing (planar view) from the thickness direction (z-axis direction) of the base portion 21 is referred to as DHW, a relationship of $1.5 \leq DHL/DHW$ is satisfied. Thereby, it is possible to increase detection sensitivity. In the figure, planar view shapes of the weight portions 252, 262, 272, and 282 are rectangular, but the planar view shape is not limited to this and may be, for example, a shape having a portion with a different width. In this case, the largest width (maximum width) of the weight portions 252, 262, 272, and 282 may be set as DHW.

Figure 5:
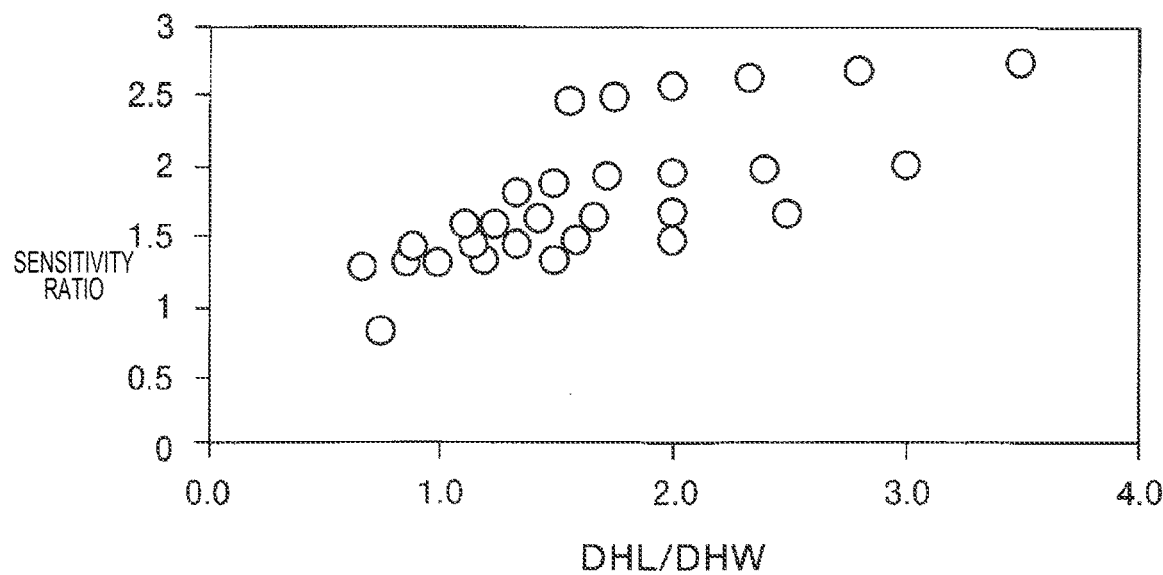
FIG. 5 is a graph illustrating a relationship between a ratio DHL/DHW between a length DHL and a width DHW of a drive weight portion and a sensitivity ratio.

FIG. 5 is a graph illustrating a relationship between the ratio DHL/DHW between the length DHL of and the width DHW of the drive weight portion and a sensitivity ratio.

As illustrated in FIG. 5, as the DHL/DHW increases, the sensitivity ratio, which is a ratio to sensitivity serving as a reference, increases. Here, if DHL/DHW is larger than or equal to 1.5, detection sensitivity tends to increase sharply. Thus, it is preferable that a relationship of $1.5 \leq DHL/DHW$ is satisfied. Values of at least one of DHL and DHW are different from each other in a plurality of points illustrated in FIG. 5.

In addition, it is more preferable that a relationship of 1.5≤DHL/DHW≤4.0 is satisfied. Thereby, it is possible to increase the detection sensitivity while reducing a CI (crystal impedance) value and reducing power consumption.

Figure 6:
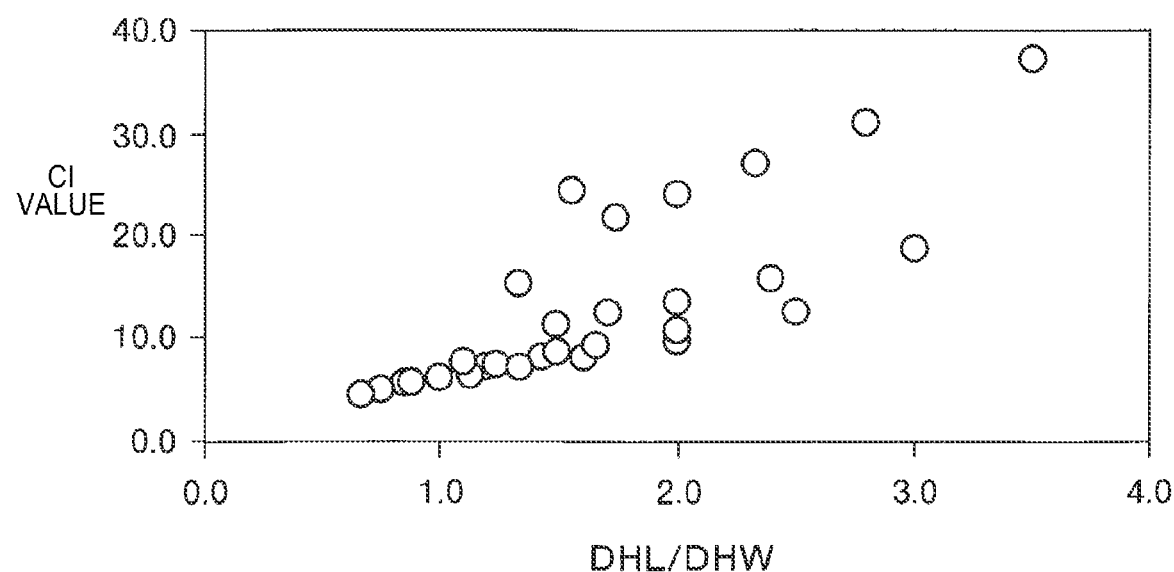
FIG. 6 is a graph illustrating the relationship between the ratio DHL/DHW between the length DHL and the width DHW of the drive weight portion and a CI value.

FIG. 6 is a graph illustrating the relationship between the ratio DHL/DHW between the length DHL and the width DHW of the drive weight portion and the CI value.

As illustrated in FIG. 6, as the DHL/DHW increases, the CI value increases. Here, it is preferable that the CI value is smaller than or equal to 100 kΩ so as to obtain appropriate amplitudes of the drive arms 25 to 28, and furthermore, it is preferable that the CI value is smaller than or equal to 40 kΩ from the view point of power saving of the sensor 1 (in a case where an operation voltage is approximately larger than or equal to 1 V and smaller than or equal to 5 V). Thus, it is preferable that the relationship of 1.5≤DHL/DHW≤4.0 is satisfied. Values of at least one of DHL and DHW are different from each other in a plurality of points illustrated in FIG. 6.

In addition, when a length of each of the extending directions (y-axis directions) of the arm portions 251, 261, 271, and 281 (drive arm portions) is referred to as DAL, it is preferable that a relationship of 1.5<DHL/DAL is satisfied. Thereby, it is possible to increase the detection sensitivity.

Figure 7:
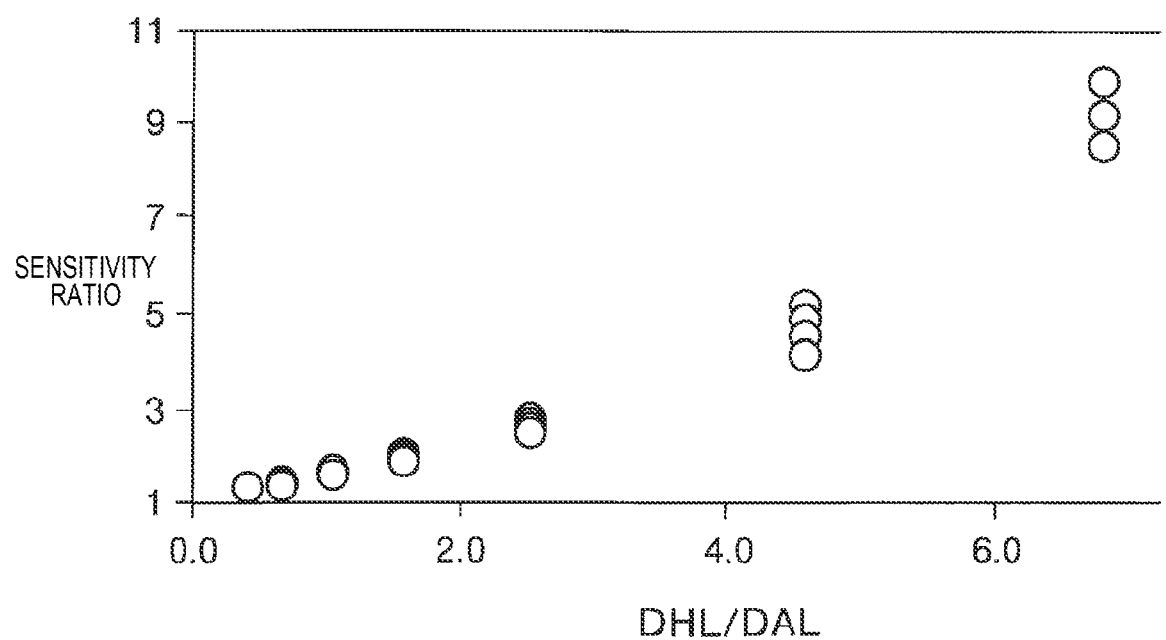
FIG. 7 is a graph illustrating a relationship between a ratio DHL/DAL between the length DHL of the drive weight portion and a length DAL of a drive arm portion and the sensitivity ratio.

FIG. 7 is a graph illustrating a relationship between a ratio DHL/DAL between the length DHL of the drive weight portion and a length DAL of the drive arm portion and a sensitivity ratio.

As illustrated in FIG. 7, as DHL/DAL increases, a sensitivity ratio, which is a ratio to sensitivity serving as a reference, increases. Here, if DHL/DAL is larger than or equal to 1.5, the detection sensitivity tends to increase sharply. Thus, it is preferable that a relationship of 1.5≤DHL/DAL is satisfied. Values of at least one of DHL and DAL are different from each other in a plurality of points illustrated in FIG. 7.

In addition, it is more preferable that a relationship of 1.5≤DHL/DAL≤4.0 is satisfied. Thereby, it is possible to increase the detection sensitivity while reducing the CI (crystal impedance) value and reducing power consumption.

Figure 8:
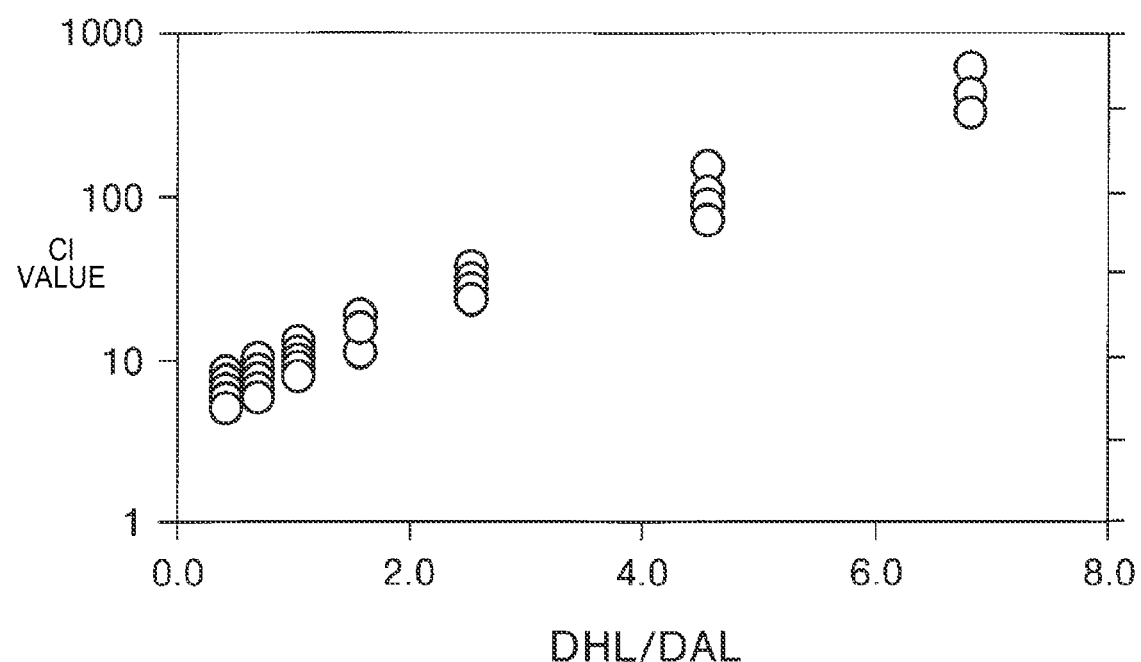
FIG. 8 is a graph illustrating a relationship between the ratio DHL/DAL between the length DHL of the drive weight portion and the length DAL of the drive arm portion and the CI value.

FIG. 8 is a graph illustrating a relationship between the ratio DHL/DAL between the length DHL of the drive weight portion and the length DAL of the drive arm portion and the CI value.

As illustrated in FIG. 8, as DHL/DAL increases, the CI value increases. Here, as described above, it is preferable that the CI value is smaller than or equal to 100 kΩ so as to obtain appropriate amplitudes of the drive arms 25 to 28, and furthermore, it is preferable that the CI value is smaller than or equal to 40 kΩ from the viewpoint of power saving of the sensor 1 (in a case where an operation voltage is approximately larger than or equal to 1 V and smaller than or equal to 5 V). Thus, it is preferable that a relationship of 1.5≤DHL/DAL≤4.0 is satisfied. Values of at least one of DHL and DAL are different from each other in a plurality of points illustrated in FIG. 8.

In addition, when a width of each of the arm portions 251, 261, 271, and 281 (drive arm portions) in the direction (x-axis direction) orthogonal to the extending direction (y-axis direction) at the time of viewing (planar view) from a thickness direction of the base portion 21 is referred to as DAW, it is preferable that a relationship of 1.2≤DHW/DAW is satisfied, it is more preferable that a relationship of 1.3≤DHW/DAW≤6.0 is satisfied, and it is particularly preferable that a relationship of 1.3≤DHW/DAW≤4.0 is satisfied. Thereby, it is possible to increase the detection sensitivity while reducing a size.

In addition, as described above, the detection arms 23 and 24 include the arm portions 231 and 241 which are detection arm portions extending from the base portion 21, and the weight portions 232 and 242 which are provided on front end sides with respect to the arm portions 231 and 241 and are detection weight portions having a larger width than the arm portions 231 and 241. Here, when a length of each of the arm portions 231 and 241 (detection arm portions) in the extending direction (y-axis direction) of the detection arms 23 and 24 is referred to as PAL and a width of each of the weight portions 232 and 242 (detection weight portions) in the extending direction (y-axis direction) of the detection arms 23 and 24 is referred to as PHL, it is preferable that a relationship of DHL/DAL>PHL/PAL is satisfied and it is more preferable that a relationship of DHL/DAL≥1.1×PHL/PAL is satisfied. Thereby, it is possible to increase the detection sensitivity. In the figure, a planar view shape of the weight portions 232 and 242 is rectangular, but the planar view shape is not limited to this and may be, for example, a shape having a portion with a different width.

In addition to the base portion 21, the pair of detection arms 23 and 24, the pair of connection arms 221 and 222, the pair of drive arms 25 and 26, and the pair of drive arms 27 and 28 which are described above, the sensor 1 includes the base 91 and the support member 4 connected (bonded) to the plurality of terminals 67 (connection portions) which is provided on the base portion 21 and supports the base portion 21 with respect to the base 91.

Specifically, the sensor 1 includes the base portion 21, the pair of detection arms 23 and 24 extending from the base portion 21 in directions (±y-axis direction) opposite to each other, the pair of connection arms 221 and 222 extending from the base portion 21 in a direction crossing the extending direction (y-axis direction) of the detection arms 23 and 24 and in directions (±x-axis direction) opposite to each other, the pair of drive arms 25 and 26 extending from each of the pair of connection arms 221 and 222 in the direction crossing the extending direction (x-axis direction) of the connection arms 221 and 222 and in the directions (±y-axis direction) opposite to each other, the pair of drive arms 27 and 28, the base 91, and the support member 4 connected (bonded) to the plurality of terminals 67 (connection portions) provided in the base portion 21 and supporting the base portion 21 with respect to the base 91 (see FIGS. 1 and 2).

Here, when the length (maximum length) of the base portion 21 in the extending direction (x-axis direction) of the connection arms 221 and 222 is referred to as Bx and the total length maximum length of the plurality of terminals 67 (connection portions) in the extending direction (x-axis direction) of the connection arms 221 and 222 is referred to as B1 (see FIG. 3), it is preferable that a relationship of B1/Bx≤0.43 is satisfied. Thereby, a distance between the terminal 67 and each of the connection arms 221 and 222 increases. Accordingly, in a detection mode in which the detection arms 23 and 24 vibrate in conjunction with the connection arms 221 and 222, it is possible to reduce that vibration frequencies (detection frequencies) of the detection arms 23 and 24 are influenced by a change in a supported state (restrained state) of the base portion 21 due to the support member 4, and as a result, the detection sensitivity can be increased.

In addition, as described above, the support member 4 has the wires 42a to 42f which are a plurality of wires bonded (connected) to the plurality of terminals 67 (connection portions) (see FIG. 4). Thereby, the support member 4 can be configured by using a flexible wiring board, and tape automated bonding (TAB) mounting can be performed. In addition, in the TAB mounting, the base portion 21 is easily influenced by distortion of the support member 4 due to a temperature change or the like in general. Thus, in a case where the support member 4 is used, satisfying the relationship between B1 and Bx described above is particularly useful for stabilizing the detection sensitivity.

In addition, in the present embodiment, the base portion 21 has a rectangular shape having a pair of first sides in the x-axis direction and a pair of second sides in the y-axis direction, in a planar view that is viewed from the z-axis direction which is a thickness direction thereof. The length Bx is a distance between the pair of second sides. In addition, a length By which will be described below is a distance between the pair of first sides. A planar view shape of the base portion 21 is not limited to a rectangle, and may be, for example, a shape obtained by chamfering a corner of the rectangle, or the like.

In addition, the length B1 is a length in the x-axis direction of a group configured by the plurality of terminals (connection portions), and is a distance in the x-axis direction between distal ends of the terminal 67 closest to the +x-axis direction side and the terminal 67 closest to the −x-axis direction side among the plurality of terminals 67 (connection portions). In addition, the length B2 which will be described below is a length in the y-axis direction of a group configured by the plurality of terminals 67 (connection portions), and is a distance in the y-axis direction between distal ends of the terminal 67 closest to the +y-axis direction side and the terminal 67 closest to the −y-axis direction side among the plurality of terminals 67 (connection portions). The six terminals 67 are regularly arranged in the figure, and the number and the arrangement of the plurality of terminals 67 are not limited to the number and the arrangement which are illustrated. In addition, in a case where the sensor element 2 is supplied with power through another wire such as a bonding wire, the terminals 67 may not be supplied with power.

Figure 9:
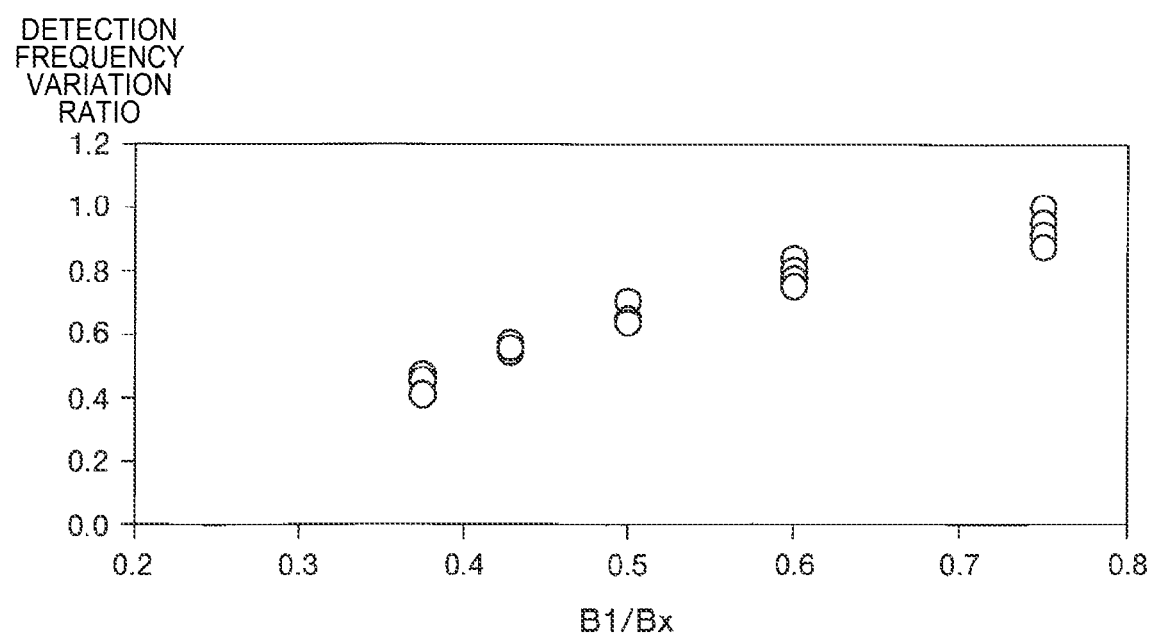
FIG. 9 is a graph illustrating a relationship between a ratio B1/Bx between a length Bx of a base portion and a total length B1 of connection portions and a detection frequency variation ratio.

FIG. 9 is a graph illustrating a relationship between the ratio B1/Bx between the length Bx of the base portion and the total length B1 of the connection portions and a detection frequency variation ratio.

As illustrated in FIG. 9, as B1/Bx increases, the detection frequency variation ratio which is a variation ratio of a detection frequency serving as a reference increases. Here, if B1/Bx is smaller than or equal to 0.43, the detection frequency variation ratio can be suppressed to approximately 40%. Values of at least one of B1 and Bx are different from each other in a plurality of points illustrated in FIG. 9.

In addition, it is preferable that a relationship of 0.25≤B1/Bx≤0.43 is satisfied. Thereby, it is possible to stabilize the detection sensitivity while reducing a size of the sensor 1.

In addition, when a length of the base portion 21 in the extending direction (y-axis direction) of the detection arms 23 and 24 is referred to as By and the total length of the plurality of terminals 67 (connection portions) in the extending direction (y-axis direction) of the detection arms 23 and 24 is referred to as B2 (see FIG. 3), it is preferable that a relationship of 0.5≤B2/By≤0.75 is satisfied. Thereby, it is possible to increase the detection sensitivity.

Figure 10:
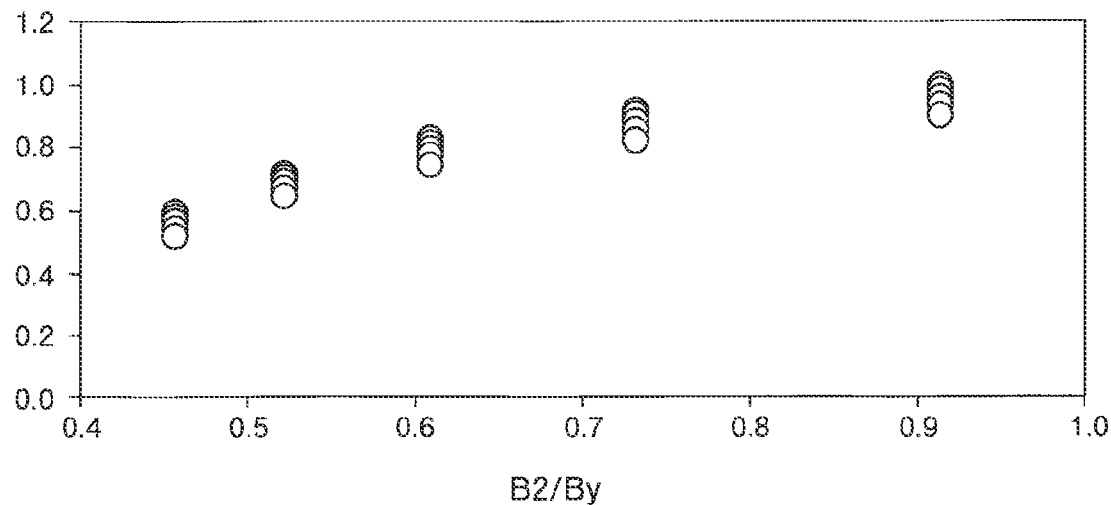
FIG. 10 is a graph illustrating a relationship between a ratio B2/By between a length By of the base portion and a total length B2 of the connection portions and the sensitivity ratio.

FIG. 10 is a graph illustrating a relationship between the ratio B2/By between the length By of the base portion and the total length B2 of the connection portions and a sensitivity ratio.

As illustrated in FIG. 10, as B2/By increases, the sensitivity ratio, which is a ratio to sensitivity serving as a reference, increases (the sensitivity is improved). In other words, as B2/By is reduced, the sensitivity ratio which is the ratio to the sensitivity serving as the reference is reduced (the sensitivity is degraded). From such a viewpoint, it is not preferable to decrease B2/By too much, and accordingly, it is preferable that B2/By is larger than or equal to 0.5. Thereby, it is possible to improve the detection sensitivity. Values of at least one of B2 and By are different from each other in a plurality of points illustrated in FIG. 10. In addition, in order to maintain a high sensitivity, it is preferable that B2/By is larger than or equal to 0.65.

In addition, while not illustrated, as B1/Bx is reduced, the sensitivity ratio which is a ratio to the sensitivity serving as the reference is reduced (the sensitivity is degraded), but a reduction ratio of the sensitivity ratio according to the reduction of B1/Bx is small (that is, a decrease in sensitivity is small), compared with a reduction ratio of the sensitivity ratio according to the reduction of B2/By.

Figure 11:
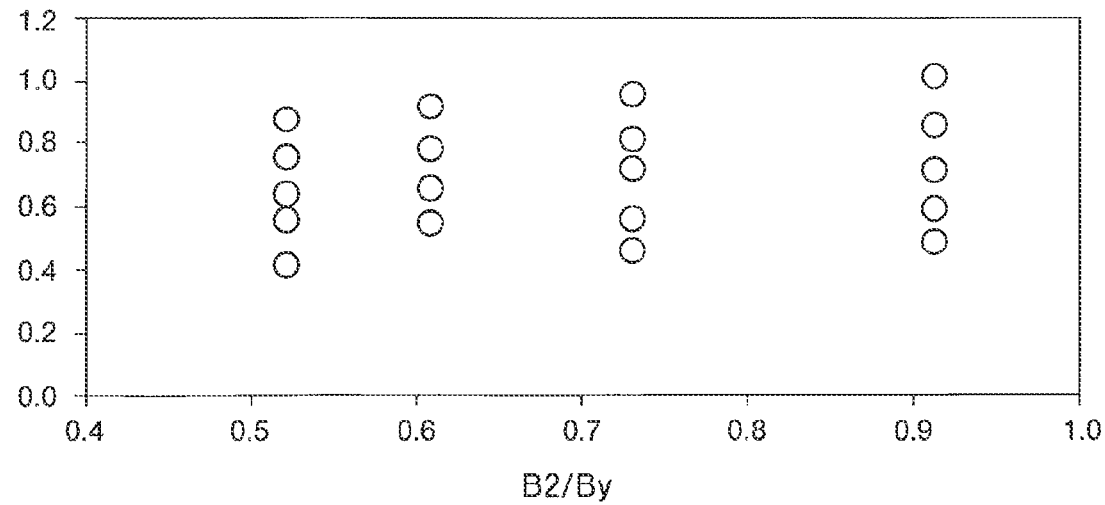
FIG. 11 is a graph illustrating a relationship between the ratio B2/By between the length By of the base portion and the total length B2 of the connection portions and the detection frequency variation ratio.

FIG. 11 is a graph illustrating a relationship between a ratio B2/By between the length By of the base portion and the total length B2 of the connection portions and the detection frequency variation ratio.

As illustrated in FIG. 11, as B2/By increases, the detection frequency variation ratio, which is a variation ratio of a detection frequency serving as a reference, increases. However, an increase ratio of the detection frequency variation ratio according to the increase of B2/By is small compared with an increase ratio of the detection frequency variation ratio according to the increase of the above-described B1/Bx. Here, if B2/By is smaller than or equal to 0.75, effects of reducing the detection frequency variation ratio are recognized. Values of at least one of B2 and By are different from each other in a plurality of points illustrated in FIG. 11.

In addition, B2/By can be set to be larger than or equal to 0.5 and smaller than or equal to 0.75. In this case, it is possible to stabilize the detection sensitivity while improving the detection sensitivity. Furthermore, B2/By can be set to be larger than or equal to 0.7 and smaller than or equal to 0.75. In this case, it is possible to stabilize the detection sensitivity while maintaining a high detection sensitivity.

Second Embodiment

Next, a second embodiment of the invention will be described.

Figure 12:
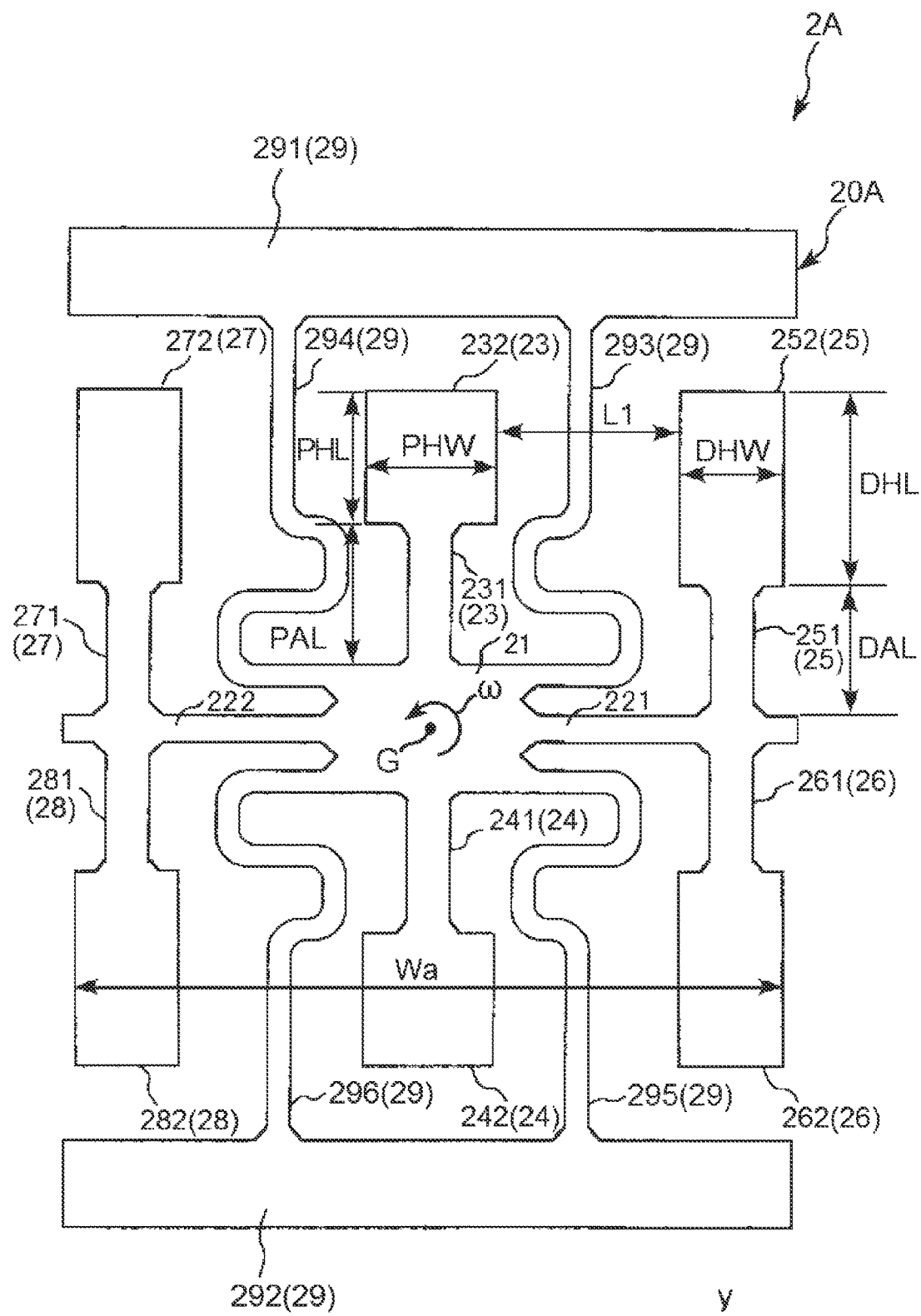
FIG. 12 is a plan view illustrating a schematic configuration of a sensor element according to a second embodiment of the invention.

FIG. 12 is a plan view illustrating a schematic configuration of a sensor element according to a second embodiment of the invention.

Hereinafter, the second embodiment will be described focusing on differences between the above-described embodiments and the second embodiment, and description of the same matters will be omitted. The same reference numerals or symbols will be attached to the same configurations as in the above-described embodiment.

A sensor element 2A illustrated in FIG. 12 includes a vibrator element piece 20A, and the vibrator element piece 20A includes the base portion 21, a support portion 29 that supports the base portion 21, the pair of detection arms 23 and 24 extending from the base portion 21, the pair of connection arms 221 and 222, and four drive arms 25 to 28 extending from the connection arms 221 and 222.

The support portion 29 includes a pair of fixing portions 291 and 292 fixed to a package (not illustrated), a pair of connection portions 293 and 294 (beam portions) connecting the fixing portion 291 to the base portion 21, and a pair of connection portions 295 and 296 connecting the fixing portion 292 to the base portion 21.

Also in the sensor element 2A, the length DHL and the width DHW of each of the weight portions 252, 262, 272, and 282 (drive weight portions) satisfy a relationship of 1.5≤DHL/DHW, and particularly, a relationship of 1.5≤DHL/DHW≤4.0 in the same manner as in the sensor element 2 according to the above-described first embodiment. Thereby, it is possible to increase the detection sensitivity.

Here, the detection arm 23 includes the arm portion 231 which is a detection arm portion extending from the base portion 21, and the weight portion 232 which is provided on a front end side with respect to the arm portion 231 and is a detection weight portion having a larger width than the arm portion 231. In the same manner, the detection arm 24 includes the arm portion 241 which is a detection arm portion and the weight portion 242 which is a detection weight portion. When a width in a direction (x-axis direction) orthogonal to an extending direction (y-axis direction) of the detection arms 23 and 24 at the time of being viewed from a thickness direction (z-axis direction) of the base portion 21 (in a planar view) and including the drive weight portion 252 of the first drive arm 25 and the drive weight portion 272 of the second drive arm 27 is referred to as Wa, and when a distance (a distance between the weight portion 242 and the weight portions 262 and 282 is the same) between the weight portion 232 (the detection weight portion) and the weight portions 252 and 272 (drive weight portions) in the extending direction (x-axis direction) of the connection arms 221 and 222 is referred to as L1 (see FIG. 12), it is preferable that a relationship of 0.15×Wa<L1<0.4×Wa is satisfied. Thereby, even in a case where the support portion 29 that supports the base portion 21 is formed integrally with the base portion 21 as in the present embodiment, it is possible that the support portion 29 (particularly, the connection portions 293 to 296 connecting the fixing portions 291 and 292 fixed to a package (not illustrated) to the base portion 21) comes into contact with the drive arms 25 to 28 and the detection arms 23 and 24.

According to the second embodiment described above, the detection sensitivity can also be improved.

Third Embodiment

Next, a third embodiment of the invention will be described.

Figure 13:
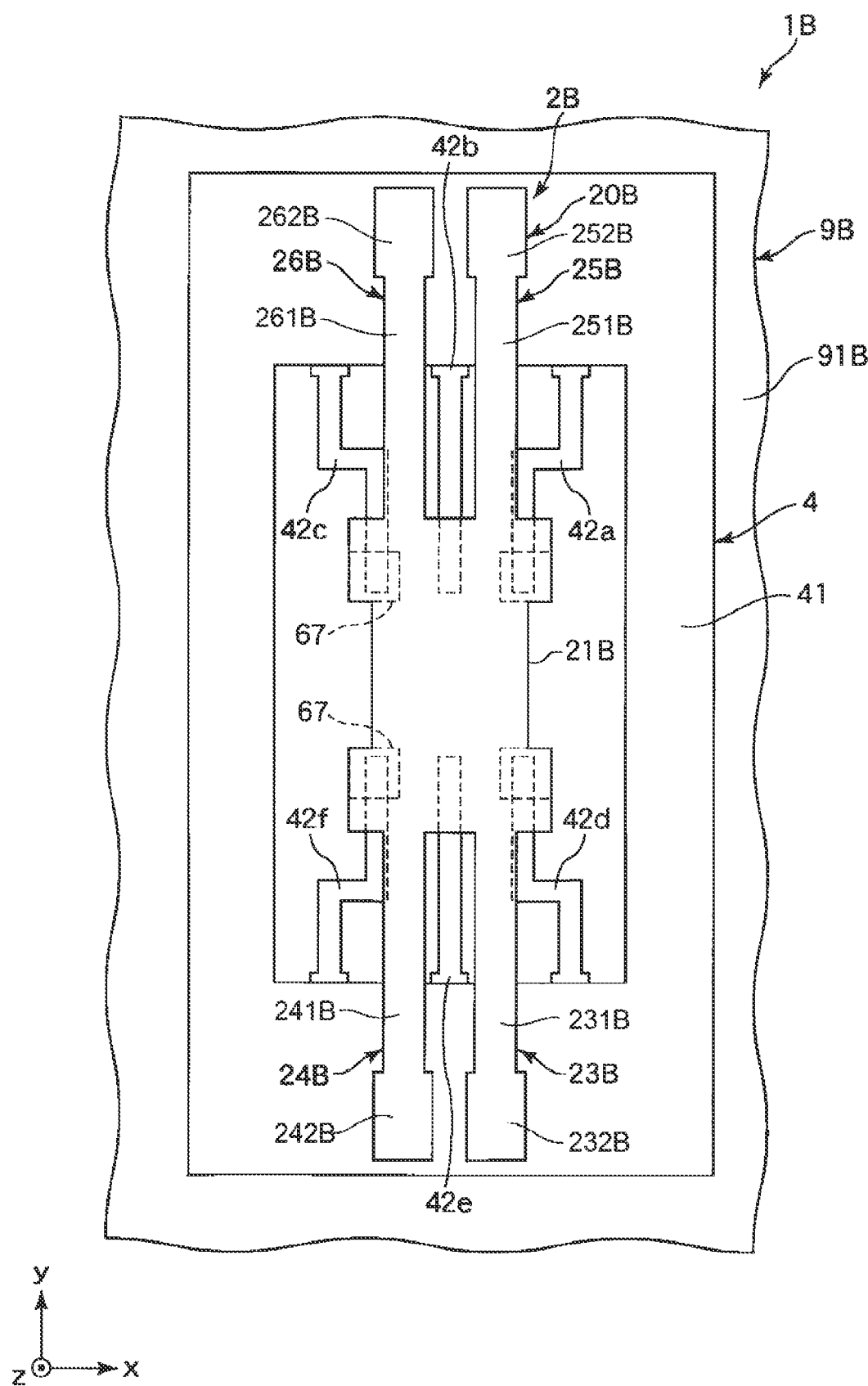
FIG. 13 is a plan view illustrating a schematic configuration of a sensor according to a third embodiment of the invention.
Figure 14:
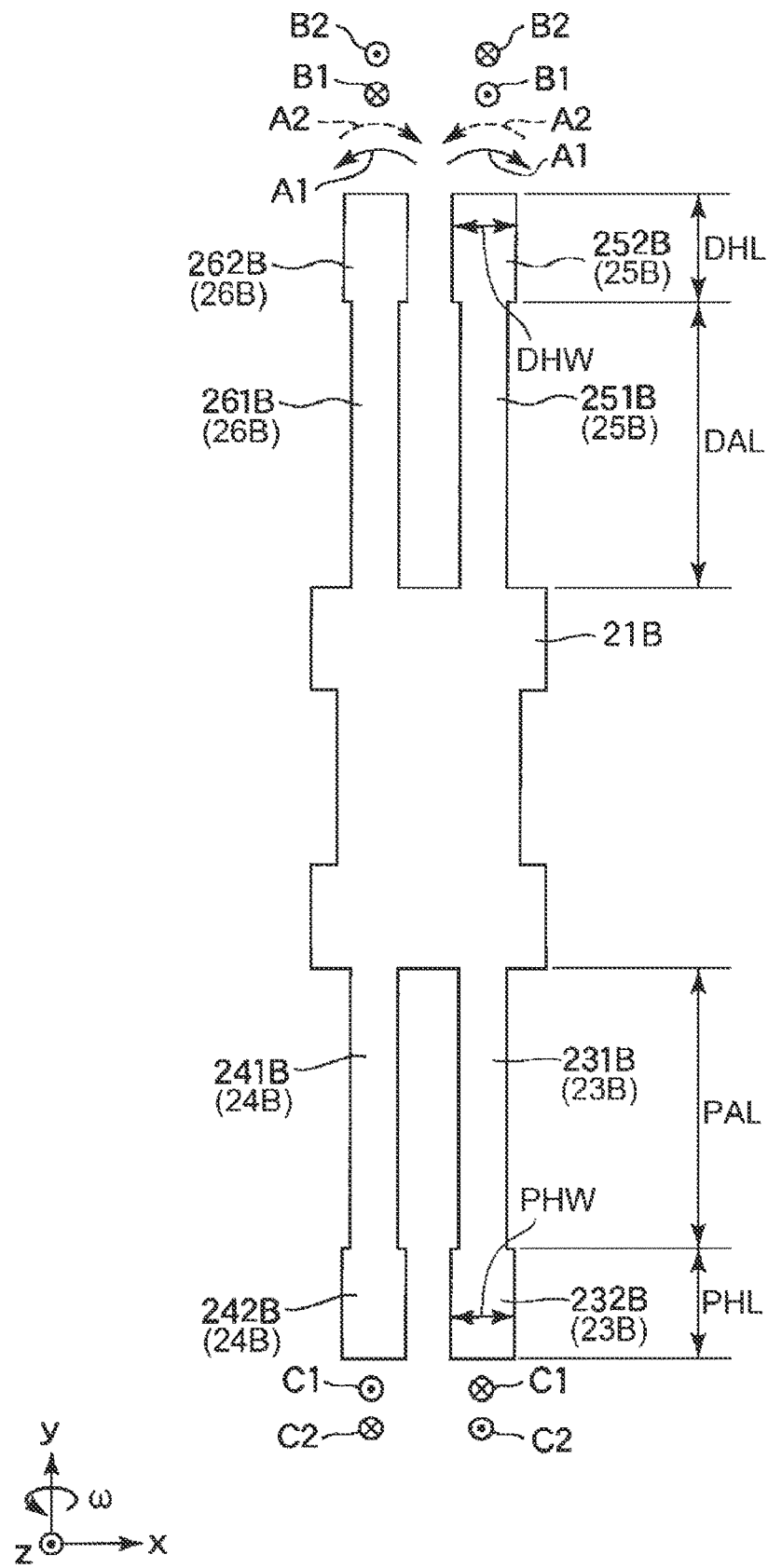
FIG. 14 is a plan view of a vibrator element piece included in the sensor illustrated in FIG. 13.

FIG. 13 is a plan view illustrating a schematic configuration of a sensor according to a third embodiment of the invention. FIG. 14 is a plan view of a vibrator element piece included in the sensor illustrated in FIG. 13.

Hereinafter, the third embodiment will be described focusing on differences from the above-described embodiment, and description of the same matters will be omitted. The same reference numerals or symbols will be attached to the same configurations as in the above-described embodiment.

A sensor 1B according to the present embodiment includes a sensor element 2B, an IC chip (not illustrated), and a package 9B that contains the sensor element 2B and the IC chip.

The sensor element 2B is an "in-plane detection type" sensor element that detects an angular velocity around the y axis. As illustrated in FIG. 13, the sensor element 2B includes a vibrator element piece 20B, a plurality of detection electrodes (not illustrated) provided on a front surface of the vibrator element piece 20B, a plurality of drive electrodes (not illustrated), and the plurality of terminals 67.

The vibrator element piece 20B includes a base portion 21B, a pair of drive arms 25B and 26B, and a pair of detection arms 23B and 24B.

In addition, the base portion 21B is supported on a base 91B of the package 9B via the support member 4 for mounting tape automated bonding (TAB).

Each of the drive arms 25B and 26B extends in the y-axis direction (+y direction) from the base portion 21B. While not illustrated, each of the drive arms 25B and 26B is provided with a pair of drive electrodes (a drive signal electrode and a drive ground electrode) that cause the drive arms 25B and 26B to perform flexural vibration in the x-axis direction by receiving power in the same manner as the drive arms 25 and 26 according to the first embodiment described above. The pair of drive electrodes are electrically connected to the corresponding terminals 67 via wires not illustrated.

Each of the detection arms 23B and 24B extends from the base portion 21B in the y-axis direction (−y direction). While not illustrated, each of the pair of detection arms 23B and 24B is provided with a pair of detection electrodes (a detection signal electrode and a detection ground electrode) that detects electric charges generated by flexural vibration in the z-axis direction of the detection arms 23B and 24B. The pair of detection electrodes are electrically connected to the corresponding terminals 67 via wires not illustrated.

In the sensor element 2B configured as described above, a driving signal is applied between the pair of drive electrodes, and thereby, the drive arm 25B and the drive arm 26B perform flexural vibration (drive vibration) so as to approach each other or to be separated from each other as indicated by arrows A1 and A2 in FIG. 14.

If the angular velocity ω around the y axis is applied to the sensor element 2B in a state where the drive arms 25B and 26B perform drive vibration as described above, the drive arms 25B and 26B perform the flexural vibration toward sides opposite to each other in the z-axis direction by the Coriolis force as indicated by arrows B1 and B2 in FIG. 14. Along with this, the detection arms 23B and 24B perform flexural vibration (detection vibration) toward sides opposite to each other in the z-axis direction as indicated by arrows C1 and C2 in FIG. 14.

Electric charges generated between the pair of detection electrodes by the flexural vibration of the detection arms 23B and 24B are output from the pair of detection electrodes. The angular velocity ω applied to the sensor element 2B can be obtained based on the electric charges.

As described above, the sensor element 2B includes the base portion 21B, the drive arms 25B and 26B extending from the base portion 21B, and the detection arms 23B and 24B extending from the base portion 21B.

In the present embodiment, the sensor element 2B includes the pair of detection arms 23B and 24B extending from the base portion 21B toward the same side as each other and the pair of drive arms 25B and 26B extending from the base portion 21B toward a side opposite to the extending direction (−y-axis direction) of the pair of detection arms 23B and 24B. Thereby, it is possible to realize a so-called H type sensor element 2B.

Here, the drive arms 25B and 26B include arm portions 251B and 261B which are drive arm portions extending from the base portion 21B, and weight portions 252B and 262B which are provided on front end sides with respect to the arm portions 251B and 261B and are drive weight portions having larger widths than the arm portions 251B and 261B. In the same manner, the detection arms 23B and 24B include arm portions 231B and 241B which are detection arm portions, and weight portions 232B and 242B which are detection weight portions.

Particularly, when a length of each of the weight portions 252B and 262B (drive weight portions) in the extending direction (y-axis direction) of the drive arms 25B and 26B is referred to as DHL, and when a width of each of the weight portions 252B and 262B (drive weight portions) in the direction (x-axis direction) orthogonal to the extending direction (y-axis direction) of the drive arms 25B and 26B at the time of being viewed from a thickness direction (z-axis direction) of the base portion 21B (in a planar view) is referred to as DHW, a relationship of 1.5≤DHL/DHW is satisfied, and particularly, a relationship of 1.5≤DHL/DHW≤4.0 is satisfied. Thereby, it is possible to increase detection sensitivity in the same manner as in the first embodiment.

According to the third embodiment as described above, the detection sensitivity can be improved.

2. Electronic Apparatus

Figure 15:
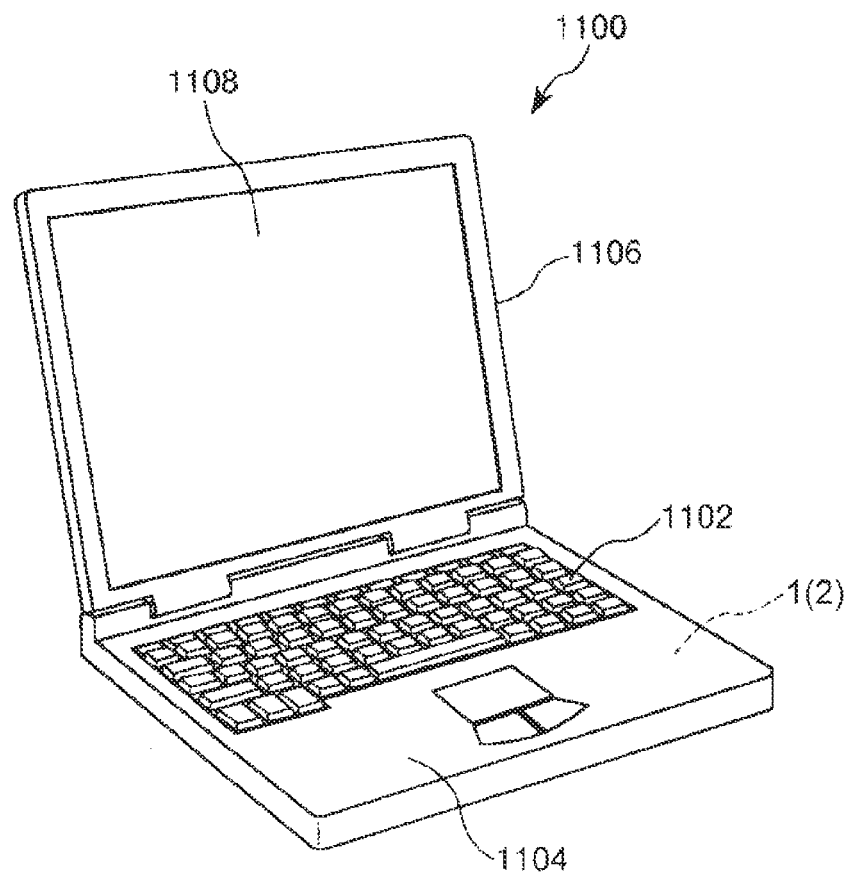
FIG. 15 is a perspective view illustrating a configuration of a mobile type (or notebook type) personal computer which is an example of an electronic apparatus according to the invention.

FIG. 15 is a perspective view illustrating a configuration of a mobile type (or notebook type) personal computer which is an example of an electronic apparatus according to the invention.

In this figure, a personal computer 1100 is configured with a main body portion 1104 including a keyboard 1102, and a display unit 1106 including a display portion 1108, and the display unit 1106 is rotatably supported to the main body portion 1104 via a hinge structure portion.

The above-described sensor 1 functioning as a gyro sensor is built in the personal computer 1100 as described above.

Figure 16:
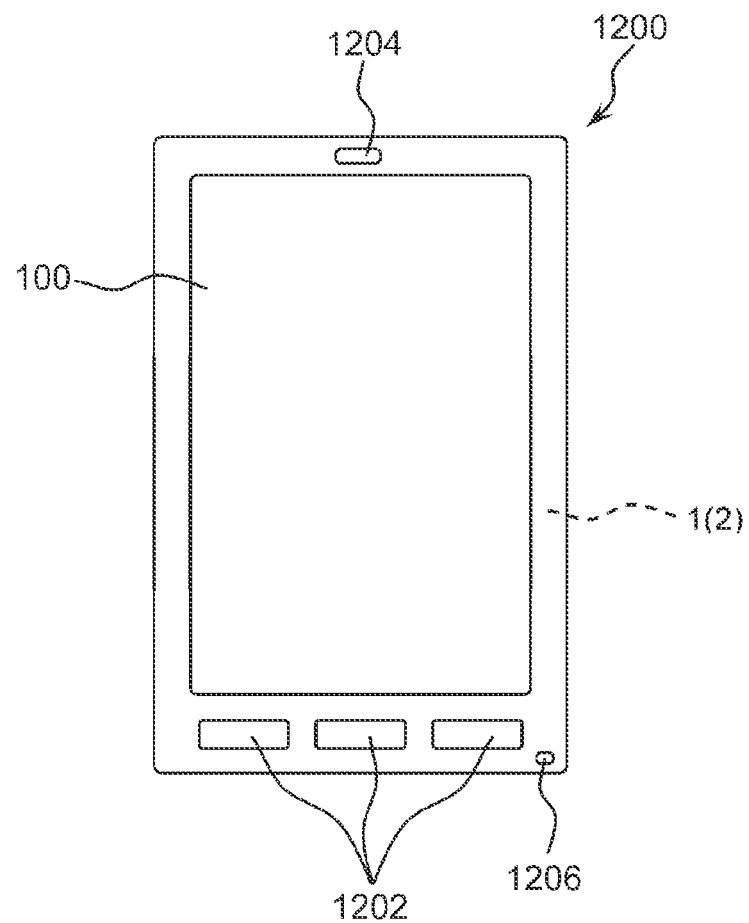
FIG. 16 is a plan view illustrating a configuration of a smartphone which is an example of the electronic apparatus according to the invention.

FIG. 16 is a plan view illustrating a configuration of a smartphone which is an example of the electronic apparatus according to the invention.

In this figure, a smartphone 1200 includes a plurality of operation buttons 1202, a phone receiving hole 1204, and a phone speaking hole 1206, and a display portion 100 is disposed between the operation buttons 1202 and the phone receiving hole 1204.

The above-described sensor 1 functioning as a gyro sensor is built in the smartphone 1200 as described above.

Figure 17:
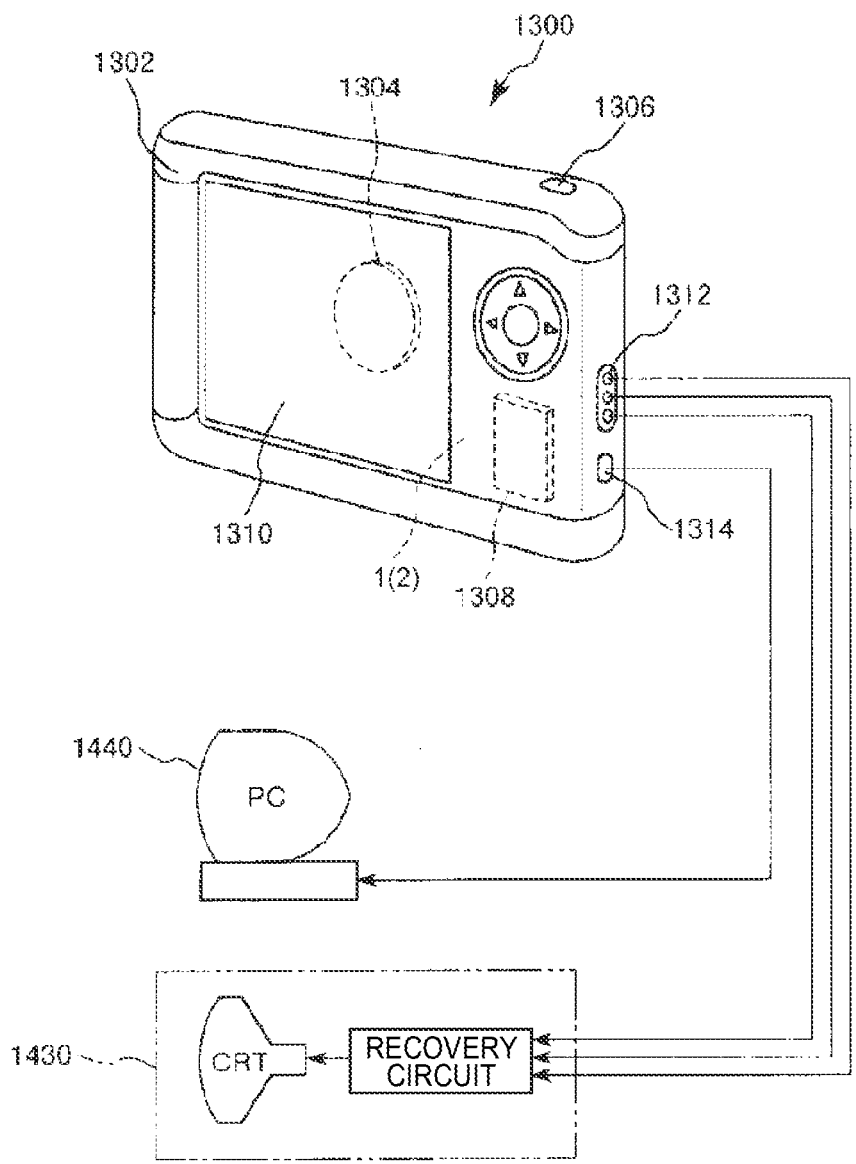
FIG. 17 is a perspective view illustrating a configuration of a digital still camera which is an example of the electronic apparatus according to the invention.

FIG. 17 is a perspective view illustrating a configuration of a digital still camera which is an example of the electronic apparatus according to the invention. A connection to an external device is also illustrated briefly in this figure.

Here, an ordinary camera exposes a silver halide photographic film to an optical image of a subject, whereas a digital still camera 1300 photoelectrically converts the optical image of the subject by using an image capturing element such as a charge coupled device (CCD), thereby, generating an image capturing signal (image signal).

A display portion 1310 is provided on a back surface of a case (body) 1302 of the digital still camera 1300, and is configured to perform display based on an image capturing signal from the CCD. The display portion 1310 functions as a finder that displays a subject as an electronic image.

In addition, a light receiving unit 1304 including an optical lens (image capturing optical system), the CCD or the like is provided on a front surface side (rear surface side in the figure) of the case 1302.

If a photographer confirms a subject image displayed on the display portion 1310 and presses a shutter button 1306, an image capturing signal of the CCD at that time is transferred to a memory 1308 and is stored therein.

In addition, in the digital still camera 1300, a video signal output terminal 1312 and an input/output terminal 1314 for data communication are provided on a side surface of the case 1302. As illustrated in the figure, a television monitor 1430 is connected to the video signal output terminal 1312, and a personal computer 1440 is connected to the input/output terminal 1314 for data communication, as necessary. Furthermore, a configuration is used in which the image capturing signal stored in the memory 1308 is output to the television monitor 1430 or the personal computer 1440 by a predetermined operation.

The sensor 1 including the above-described sensor element 2 (or 2A and 2B) functioning as a gyro sensor is built in the digital still camera 1300.

The above-described electronic apparatus includes the sensor 1 having the sensor element 2 (or 2A and 2B). According to the electronic apparatus, characteristics of the electronic apparatus can be enhanced by excellent characteristics (detection sensitivity and the like) of the sensor element 2 (or 2A and 2B). In a case where the sensor 1 satisfies the relationship of B1/Bx≤0.43, detection sensitivity of the sensor 1 is stabilized, and thereby, the characteristics (for example, reliability) of the electronic apparatus can be enhanced.

In addition to the personal computer (mobile personal computer) of FIG. 15, the smartphone (mobile phone) of FIG. 16, and the digital still camera of FIG. 17, the electronic apparatus according to the invention can also be applied to, for example, a tablet terminal, a timepiece, a body attitude detection device, a pointing device, a head mount display, an ink jet type ejection device (for example, an ink jet printer), a laptop type personal computer, a television, a video camera, a video tape recorder, a navigation device, a pager, an electronic diary (including a communication function), an electronic dictionary, an electronic calculator, an electronic game machine, a game controller, a word processor, a workstation, a video phone, a television monitor for security, an electronic binocular, a POS terminal, a medical apparatus (for example, electronic thermometer, a blood pressure meter, a blood glucose meter, an electrocardiogram measuring device, an ultrasonic diagnostic device, an electronic endoscope), a fish finder, various measuring instruments, instruments (for example, instruments of a vehicle, an aircraft, a ship), a flight simulator, and the like, depending on a type of a sensor.

3. Vehicle

Figure 18:
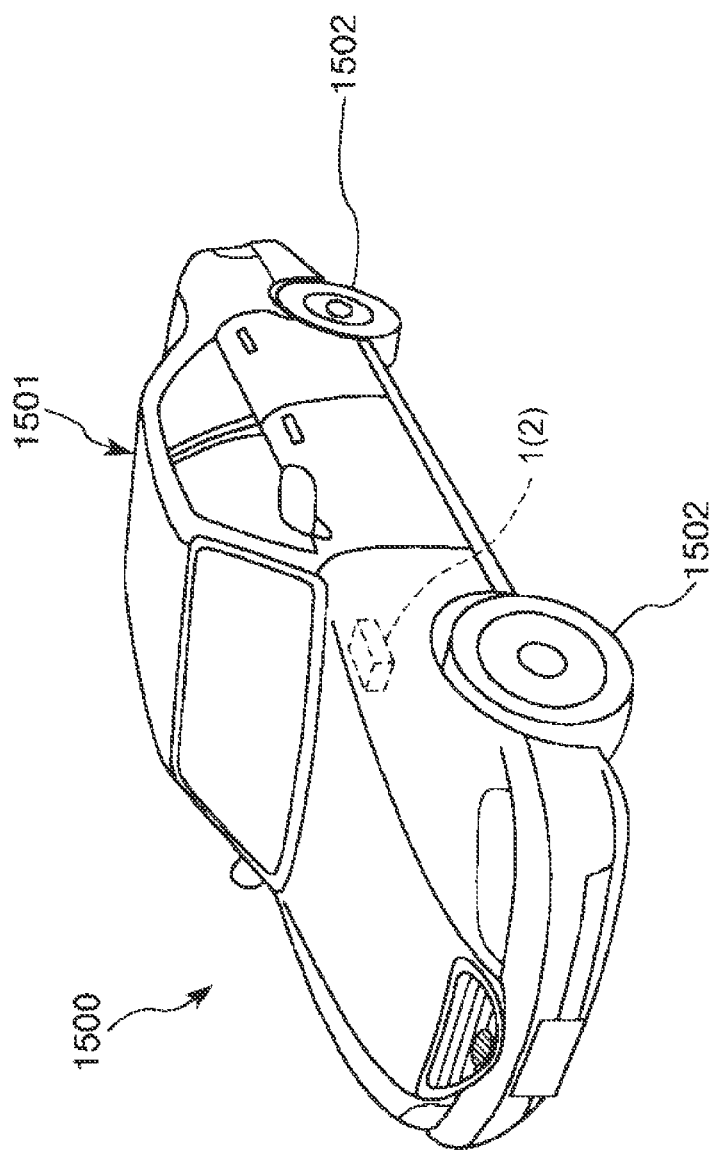
FIG. 18 is a perspective view illustrating an example of a vehicle (automobile) according to the invention.

FIG. 18 is a perspective view illustrating an example of a vehicle (automobile) according to the invention. In this figure, a vehicle 1500 includes a vehicle body 1501 and four wheels 1502, and is configured to rotate the wheels 1502 by a power source (engine) (not illustrated) provided in the vehicle body 1501. The sensor 1 having the sensor element 2 (or 2A and 2B) is built in the vehicle 1500.

As described above, the vehicle 1500 includes the sensor 1 having the sensor element 2 (or 2A and 2B). According to the vehicle 1500, characteristics of the vehicle 1500 can be enhanced by excellent characteristics (detection sensitivity and the like) of the sensor element 2 (or 2A and 2B). In a case where the sensor 1 satisfies a relationship of B1/Bx≤0.43, the detection sensitivity of the sensor 1 is stabilized, and thereby, the characteristics (for example, reliability) of the vehicle 1500 can be enhanced.

As described above, the sensor element, the sensor, the electronic apparatus, and the vehicle according to the invention are described based on the respective embodiments illustrated in the figures, but the invention is not limited to the embodiments, and the configurations of each portion can be replaced with an arbitrary configuration having the same function. In addition, any other configuration may be added.

In addition, the invention may be configured by a combination of arbitrary two or more configurations (features) of the respective embodiments described above.

In addition, in the above-described embodiments, a case where a vibrator element piece is formed of a piezoelectric material is described as an example, but the vibrator element piece may be formed of a non-piezoelectric material such as silicon or quartz. In this case, for example, a piezoelectric element may be provided on a substrate formed of a non-piezoelectric material. In addition, in this case, if the vibrator element piece is formed of the silicon, a vibrator element piece with excellent vibration characteristics can be realized at a relatively low cost. In addition, a vibrator element piece with high dimensional accuracy can be formed by etching using a known fine processing technique. Accordingly, it is possible to reduce a size of the vibrator element piece.

In addition, in the above-described embodiments, a case where a piezoelectric drive method which uses inverse piezoelectric effects is used as a drive method of a vibrator element piece is described as an example, the invention is not limited to this, and, for example, an electrostatic drive method which uses electrostatic force, an electromagnetic drive method which uses electromagnetic force, and the like can be used. In the same manner, in the above-described embodiment, a case where a piezoelectric detection method which uses piezoelectric effects is used as a detection method of a vibrator element piece is described as an example, the invention is not limited to this, and, for example, an electrostatic capacitance detection method for detecting electrostatic capacitance, a piezo resistance detection method for detecting a resistance value of a piezo resistor, an electromagnetic detection method for detecting an induced electromotive force, an optical detection method, and the like can be used. In addition, an arbitrary combination of the above-described methods can be used for the drive method and the detection method.

In addition, in the above-described embodiments, a case where a support member is a flexible wiring board for TAB mounting is described as an example, a form of the support member is not limited to this, and a base portion and the support member may be formed integrally. For example, the support member may have the form of a beam portion formed integrally with the base portion as disclosed in JP-A-2016-85179. In this case, a connection portion between the beam portion and the base portion may be regarded as a "connection portion" provided in the base portion.

The entire disclosure of Japanese Patent Application Nos. 2017-062253, filed Mar. 28, 2017 and 2017-062252, filed Mar. 28, 2017 are expressly incorporated by reference herein.

What is claimed is:

1. A sensor element comprising:
   a base;
   a drive arm extending from the base or a connection arm connected to the base, the drive arm extending along a first axis; and
   a detection arm extending from the base along a second axis,
   wherein the drive arm includes a drive arm portion that extends from the base or the connection arm, and a drive weight that is provided an end of the drive arm portion opposite the base or the connection arm, the drive weight having a width that is larger than a width of the drive arm portion, and
   wherein when a length of the drive weight along the first axis is referred to as DHL and a width of the drive weight in a direction orthogonal to the first axis in a planar view is referred to as DHW, a relationship of $1.5 \leq DHL/DHW$ is satisfied.

2. The sensor element according to claim 1, wherein a relationship of $1.5 \leq DHL/DHW \leq 4.0$ is satisfied.

3. The sensor element according to claim 1, wherein when a length of the drive arm portion along the first axis is referred to as DAL, a relationship of $1.5 < DHL/DAL$ is satisfied.

4. The sensor element according to claim 1, wherein when a width of the drive arm portion in a direction orthogonal to the first axis in the planar view is referred to as DAW, a relationship of $1.2 \leq DHW/DAW$ is satisfied.

5. The sensor element according to claim 1, wherein the detection arm includes a detection arm portion extending from the base, and a detection weight provided on an end of the detection arm portion opposite the base, the detection weight having a width that is larger than a width of the detection arm portion, and
   wherein when a length of the detection arm portion along the second axis is referred to as PAL, a length of the detection weight along the second axis is referred to as PHL, and a length of the drive arm portion along the first axis is referred to as DAL, a relationship of $DHL/DAL > PHL/PAL$ is satisfied.

6. The sensor element according to claim 1, wherein the detection arm includes a first detection arm extending from the base in a first direction and a second detection arm extending from the base in a second direction opposite the first direction,
   wherein the connection arm includes a first connection arm extending from the base along a third axis in a third direction and a second connection arm extending from the base along the third axis in a fourth direction, the third axis crossing the first axis and the second axis, and the fourth direction being opposite the third direction, and
   wherein the drive arm includes a first drive arm extending from the first connection arm in the first direction and a second drive arm extending from the second connection arm in the first direction.

7. The sensor element according to claim 6, wherein the first detection arm includes a detection arm portion extending from the base and a detection weight that is provided on an end of the detection arm portion opposite the base, the detection weight having a width that is larger than a width of the detection arm portion, and
   wherein when a width of a drive weight of the first drive arm in a direction orthogonal to the first direction in the planar view and a width of a drive weight of the second drive arm in the direction orthogonal to the first direction in the planar view is referred to as Wa, and at least one of a distance between the detection weight in the second direction and the drive weight of the first drive arm and a distance between the detection weight in the second direction and the drive weight of the second drive arm is referred to as L1, a relationship of $0.15 \times Wa < L1 < 0.4 \times Wa$ is satisfied.

8. The sensor element according to claim 1, wherein the detection arm is one of a pair of detection arms extending from a first side of the base; and
   the drive arm is one of a pair of drive arms extending from a second side of the base, the second side being opposite the first side.

9. A sensor comprising:
the sensor element according to claim 1.

10. A sensor comprising:
a sensor base;
a pair of detection arms extending from the sensor base along a first axis in opposite directions;
a pair of connection arms extending from the sensor base along a second axis in opposite directions, the second axis crossing the first axis;
a pair of drive arms extending from each of the pair of connection arms along a third axis and a fourth axis, each of the pair of drive arms extending in opposite directions, and the third axis and the fourth axis each crossing the second axis;
a plurality of connection terminals arranged on the sensor base;
a package base; and
a support that is connected to the plurality of connection terminals and supports the sensor base with respect to the package base,
wherein when a length of the sensor base along the second axis is referred to as Bx and a total length of the plurality of connection terminals along the second axis is referred to as B1, a relationship of $B1/Bx \leq 0.43$ is satisfied.

11. The sensor according to claim 10,
wherein a relationship of $0.25 \leq B1/Bx \leq 0.43$ is satisfied.

12. The sensor according to claim 10,
wherein when a length of the sensor base along the first axis is referred to as By and a total length of the plurality of connection terminals along the first axis is referred to as B2, a relationship of $B2/By \geq 0.5$ is satisfied.

13. The sensor according to claim 10,
wherein the plurality of connection terminals are arranged in a matrix form.

14. The sensor according to claim 10,
wherein the plurality of connection terminals are arranged in a matrix form with predetermined intervals along the second axis and with predetermined intervals in directions crossing the second axis.

15. The sensor according to claim 10,
wherein the support includes a plurality of wires that are connected to the plurality of connection terminals.

16. The sensor according to claim 10,
wherein each of the pair of drive arms includes a drive arm portion extending from one of the pair of connection arms and a drive weight provided on an end of the drive arm portion opposite the one of the pair of connection arms, the drive weight having a larger width than the drive arm portion, and
wherein when a length of the drive weight along the third axis or the fourth axis is referred to as DHL and a width of the drive weight in a direction orthogonal to the third axis or the fourth axis in a planar view is referred to as DHW, a relationship of $1.5 \leq DHL/DHW$ is satisfied.

17. An electronic apparatus comprising:
the sensor according to claim 9.

18. A vehicle comprising:
the sensor according to claim 9.

19. An electronic apparatus comprising:
the sensor according to claim 10.

20. A vehicle comprising:
the sensor according to claim 10.

* * * * *